United States Patent
Sato et al.

(10) Patent No.: US 9,495,789 B2
(45) Date of Patent: Nov. 15, 2016

(54) INFORMATION PROCESSING APPARATUS, INFORMATION PROCESSING METHOD AND COMPUTER PROGRAM

(71) Applicant: Sony Corporation, Tokyo (JP)

(72) Inventors: Takamasa Sato, Kanagawa (JP); Takayuki Ochi, Kanagawa (JP); Yorimitsu Naito, Saitama (JP); Kazuhiro Nakagomi, Tokyo (JP); Susumu Nagano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 335 days.

(21) Appl. No.: 13/847,082

(22) Filed: Mar. 19, 2013

(65) Prior Publication Data

US 2013/0257859 A1    Oct. 3, 2013

(30) Foreign Application Priority Data

Mar. 30, 2012 (JP) ................. 2012-080992

(51) Int. Cl.
  *G06T 19/00*   (2011.01)
  *G06T 15/00*   (2011.01)

(52) U.S. Cl.
  CPC ............. *G06T 15/005* (2013.01); *G06T 19/00* (2013.01); *G06T 15/00* (2013.01)

(58) Field of Classification Search
  None
  See application file for complete search history.

(56) References Cited

U.S. PATENT DOCUMENTS

| | | | | |
|---|---|---|---|---|
| 7,970,639 | B2* | 6/2011 | Vucina et al. | 705/7.13 |
| 2009/0284531 | A1 | 11/2009 | Ishioka | |
| 2010/0185984 | A1* | 7/2010 | Wright | G06T 11/206 715/833 |
| 2010/0194766 | A1* | 8/2010 | Nakagawa | G06T 17/005 345/543 |
| 2010/0271398 | A1* | 10/2010 | Apted | 345/650 |
| 2011/0093476 | A1* | 4/2011 | Fukazawa et al. | 707/749 |
| 2011/0154208 | A1* | 6/2011 | Horii | 715/736 |
| 2011/0179368 | A1* | 7/2011 | King et al. | 715/769 |
| 2012/0110022 | A1* | 5/2012 | Hoang et al. | 707/792 |
| 2012/0290635 | A1* | 11/2012 | Yuki | 709/202 |
| 2012/0299965 | A1* | 11/2012 | Agarwal et al. | 345/660 |
| 2012/0315954 | A1* | 12/2012 | Ahn et al. | 455/556.1 |

FOREIGN PATENT DOCUMENTS

JP         2009-282574 A         12/2009

OTHER PUBLICATIONS

Thomas Kapler, William Wright, "GeoTime information visualization", 2005, Information Visualization.*
Van Buren Lab, "StarNet results", Jun. 26, 2008, VanBurenLab.*
TheArtOfWeb, "3D Transforms and Animation", Dec. 16, 2011, web.archive.org.*
G. Di Battista, P.Eades, R.Tamassia, I.G.Tolis, "Algorithms for Drawing Graphs: an Annotated Bibliography", Computational Geometry: Theory and Applications, Jun. 1994, pp. 1-43.
"Force-Directed Drawing Algorithms", Stephen G. Kobourov, University of Arizona, Chapter 5, pp. 1-17.

* cited by examiner

*Primary Examiner* — Mark Zimmerman
*Assistant Examiner* — Yu-Jang Tswei
(74) *Attorney, Agent, or Firm* — Chip Law Group

(57) ABSTRACT

There is provided an information processing apparatus including a display controlling unit configured to, at a time of displaying content on a screen, set one axis in a three-dimensional space as a time axis, arrange pieces of content along one or more of the time axes, cause the time axis to be rotatable in a foreground direction and a background direction of the screen with one axis substantially orthogonal to the time axis regarded as a center, and, in a case where the time axis is inclined by a predetermined angle or more toward a foreground, change a display state of content after a predetermined reference time among the pieces of content arranged along the time axis.

16 Claims, 22 Drawing Sheets

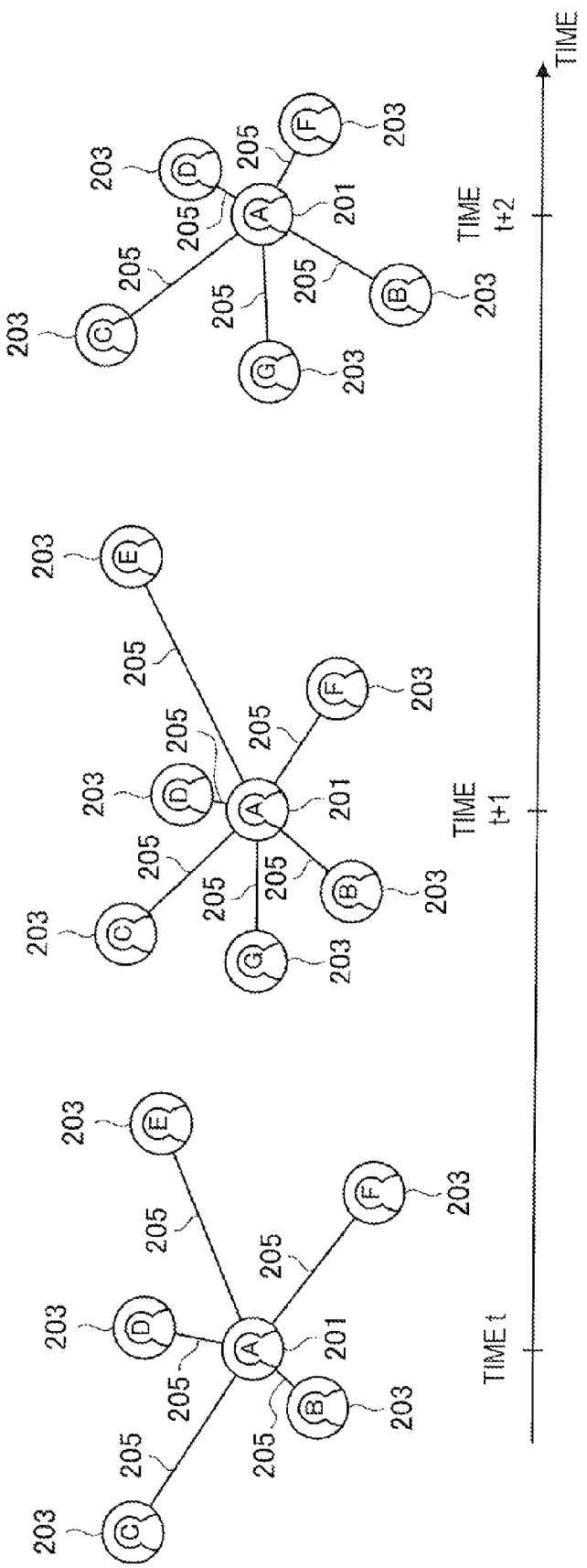

FIG. 9

| CATEGORY | FAMILIARITY ADDITION | RELATIONSHIP |
|---|---|---|
| SPOUSE | LARGE | SPOUSE |
| CHILD | LARGE | CHILD |
| PARENT | MEDIUM | PARENT |
| SIBLING | MEDIUM | SIBLING |
| COUPLE | MEDIUM | BOYFRIEND OR GIRLFRIEND |
| FRIEND | MEDIUM | FRIEND |
| CONTACT | SMALL | ACQUAINTANCE |
| RELATIVE | SMALL | RELATIVE |
| OTHER | NONE | OTHER |

FIG. 12
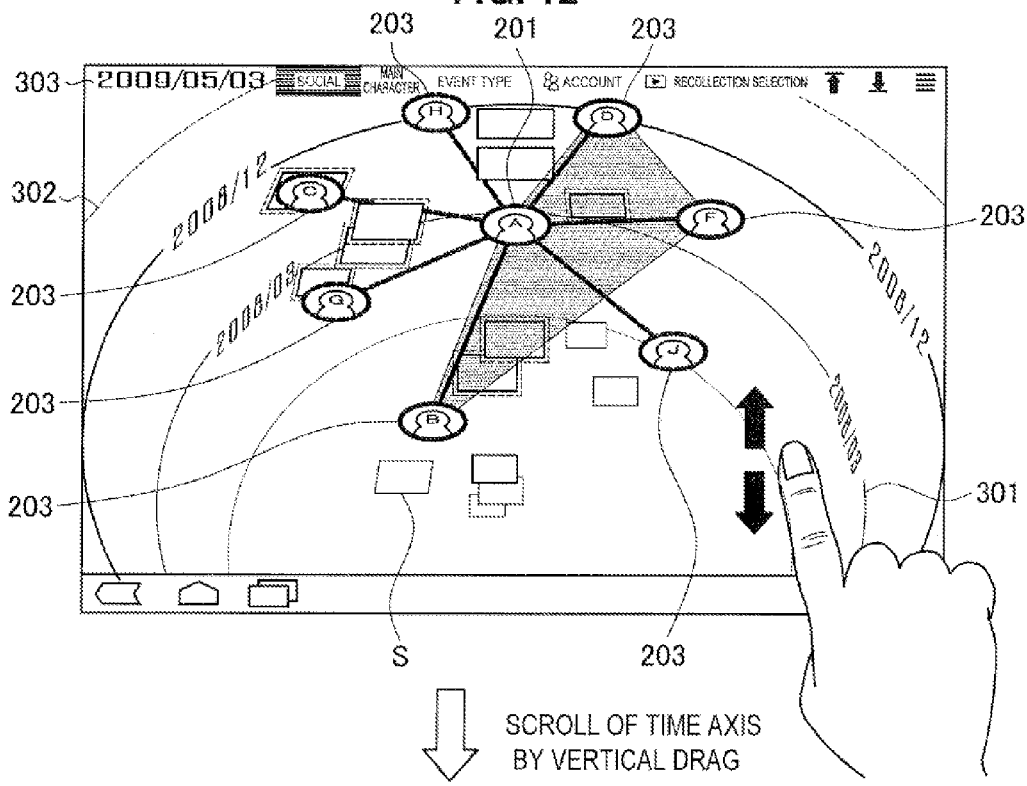
SCROLL OF TIME AXIS BY VERTICAL DRAG
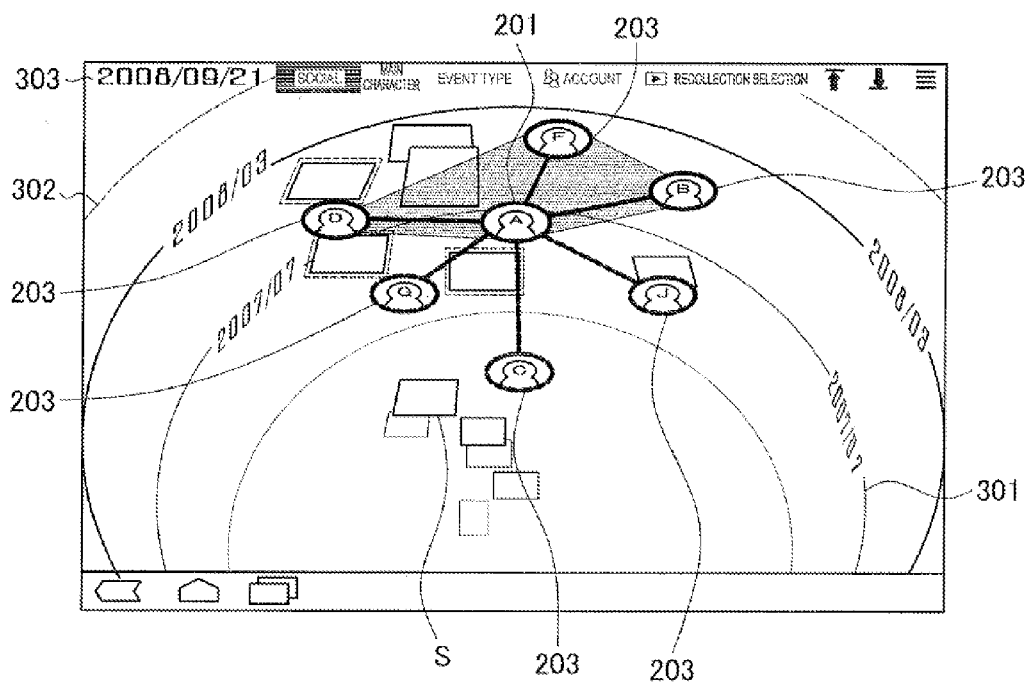

FIG. 13
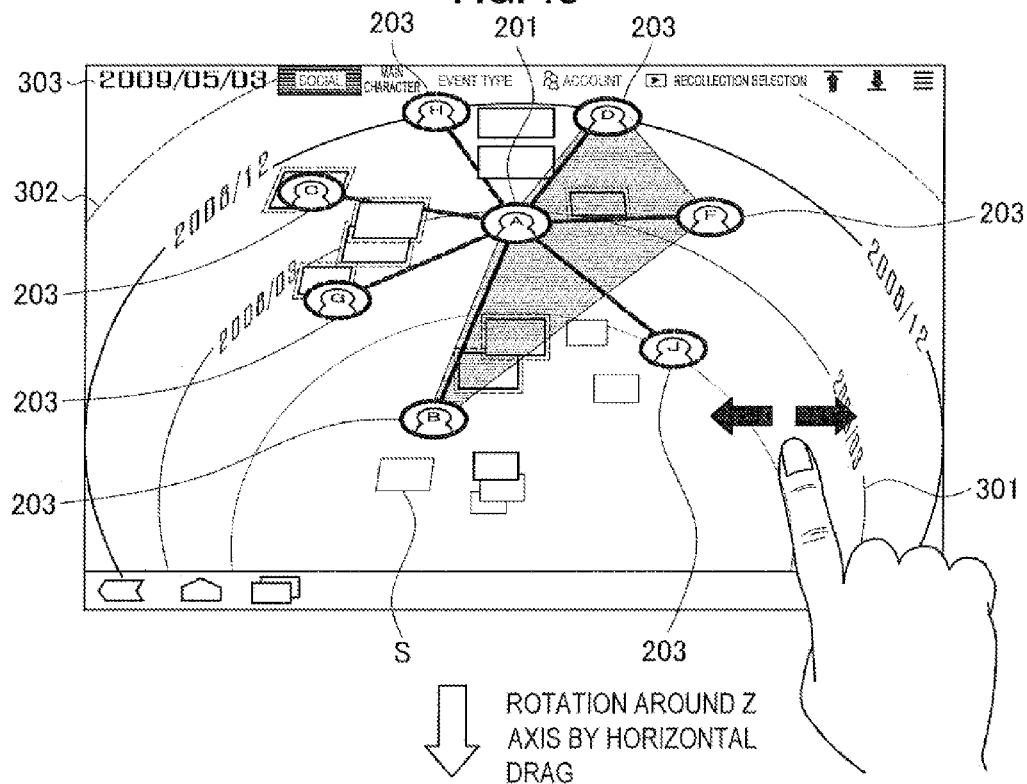
ROTATION AROUND Z AXIS BY HORIZONTAL DRAG
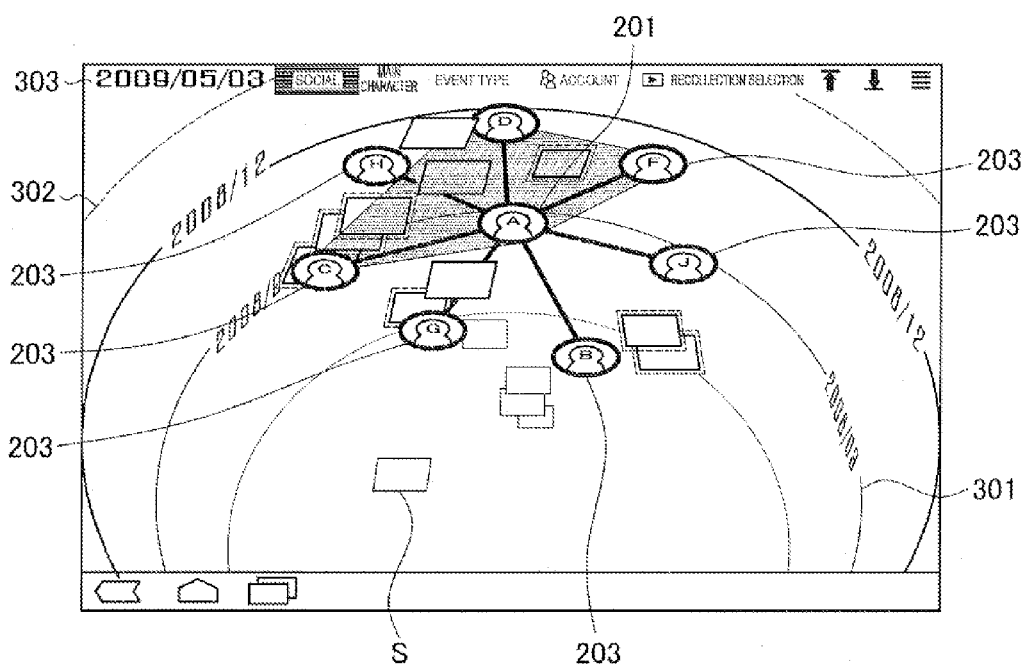

FIG. 15
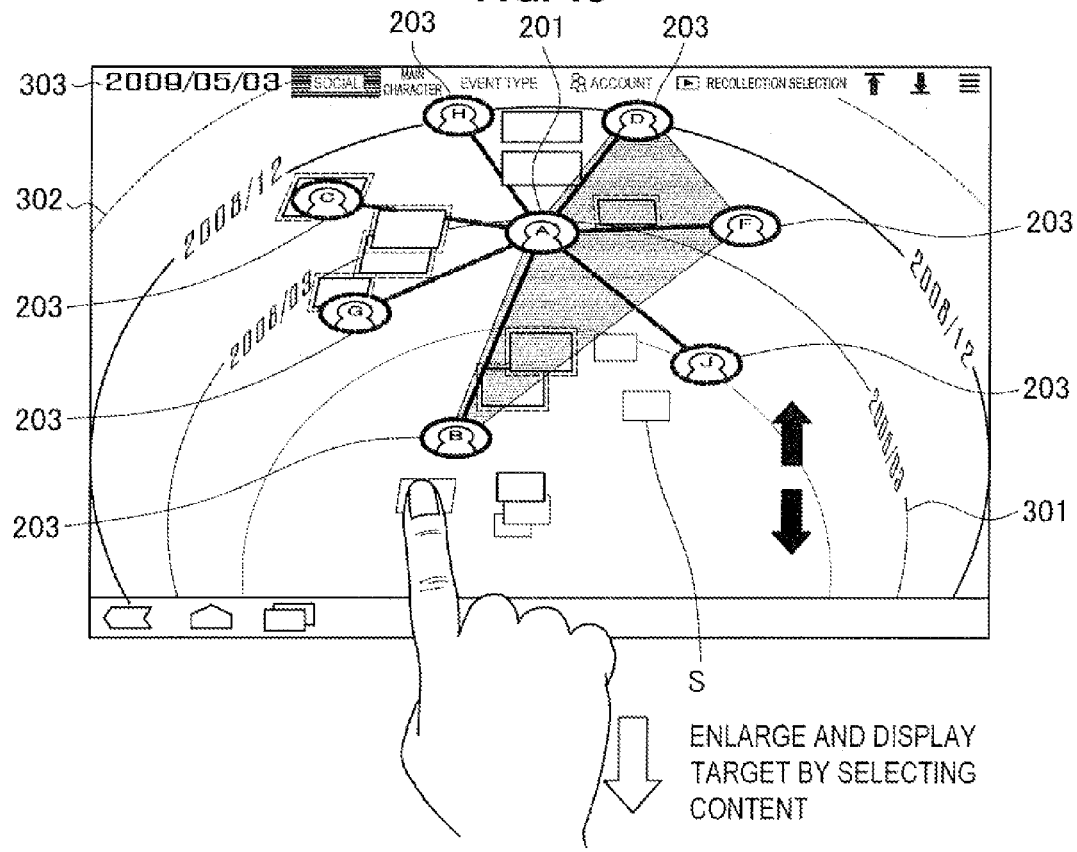
ENLARGE AND DISPLAY TARGET BY SELECTING CONTENT
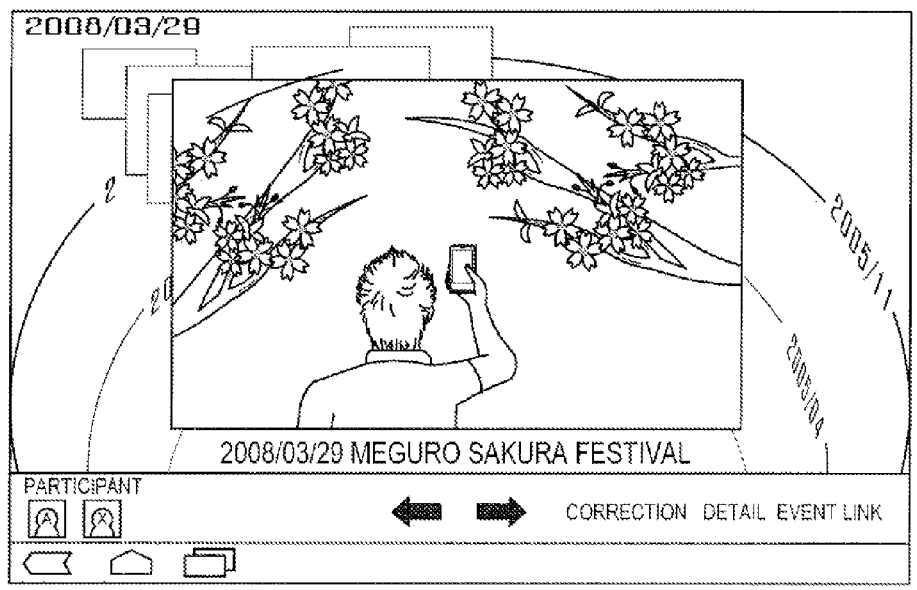

FIG. 16
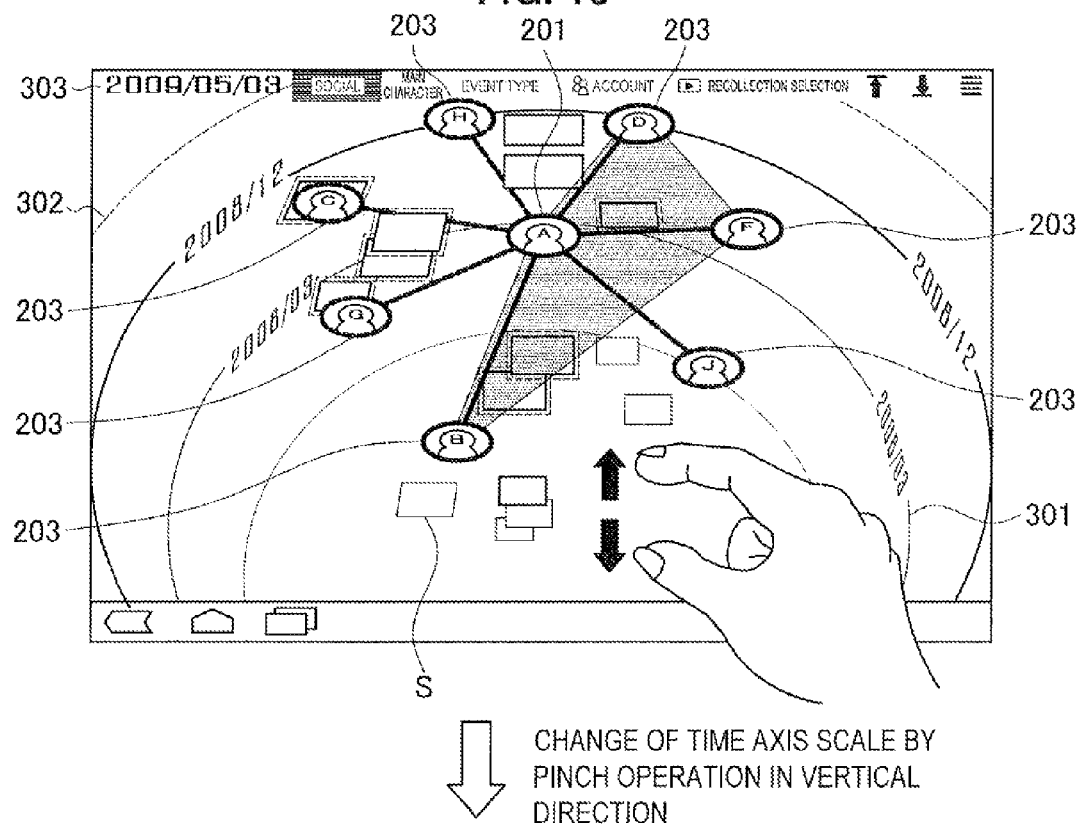
CHANGE OF TIME AXIS SCALE BY PINCH OPERATION IN VERTICAL DIRECTION
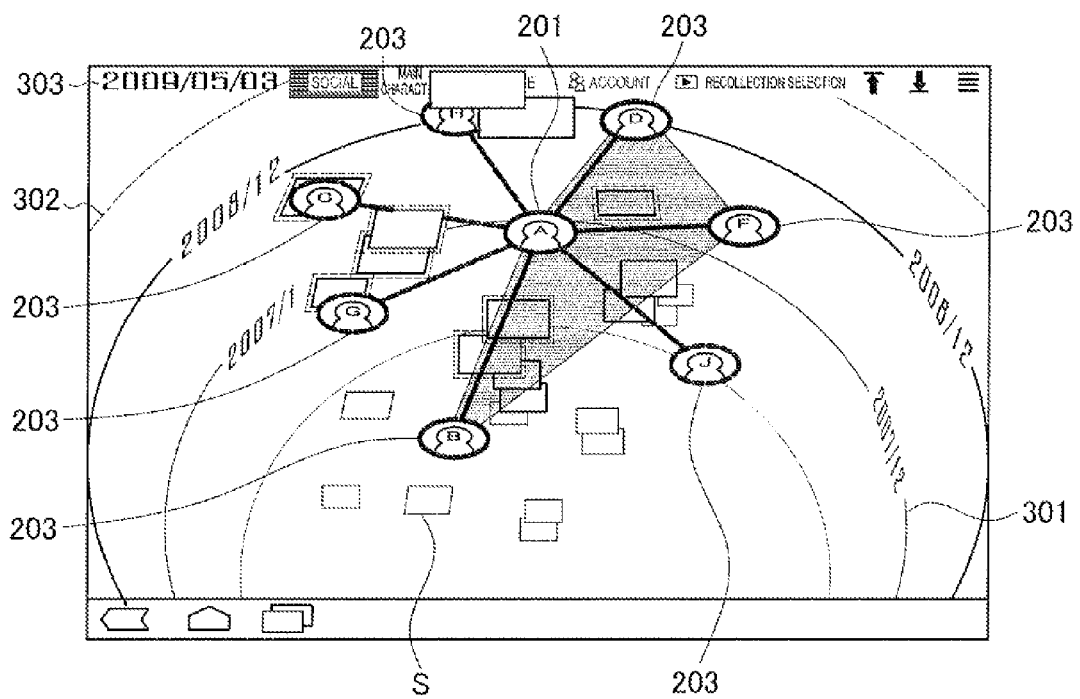

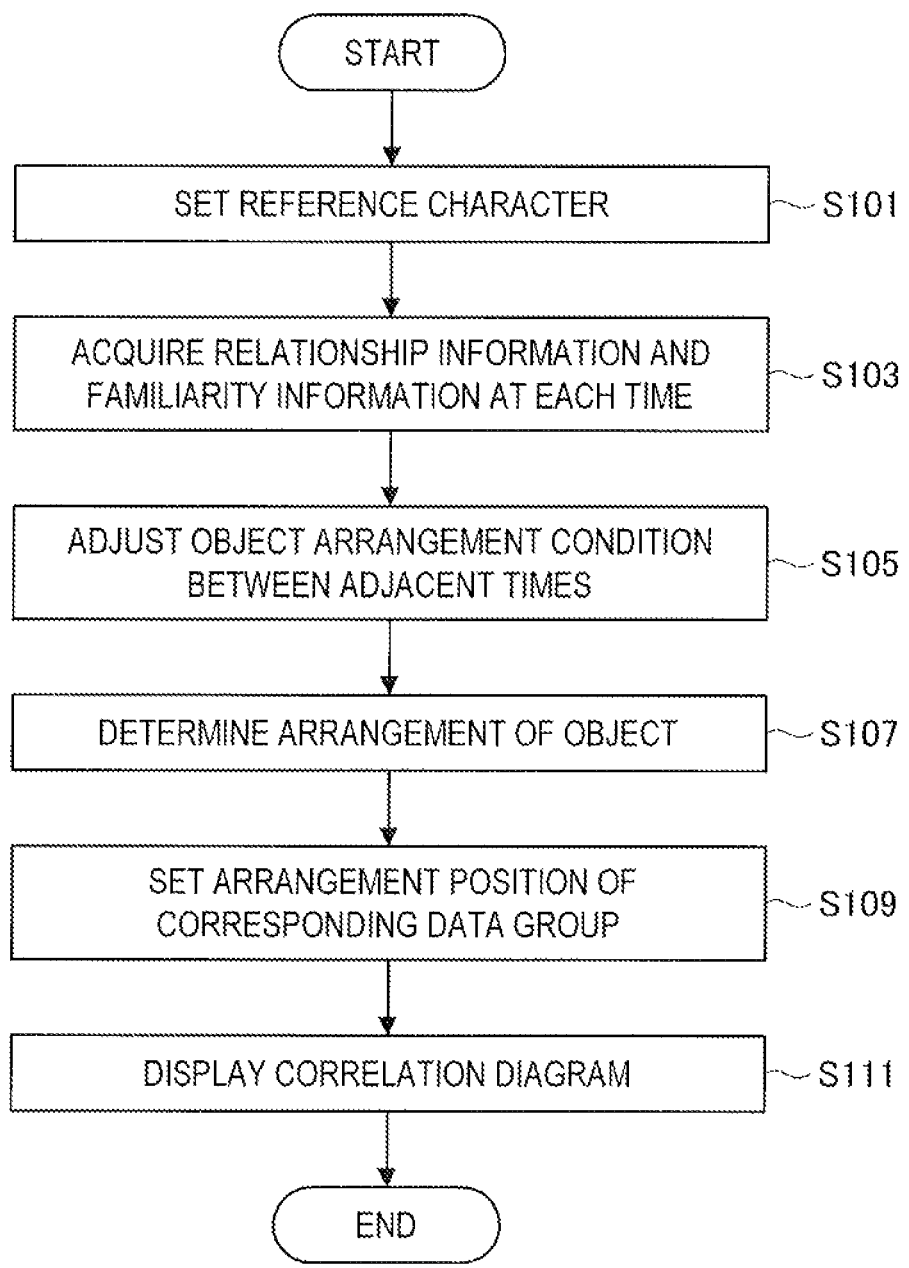

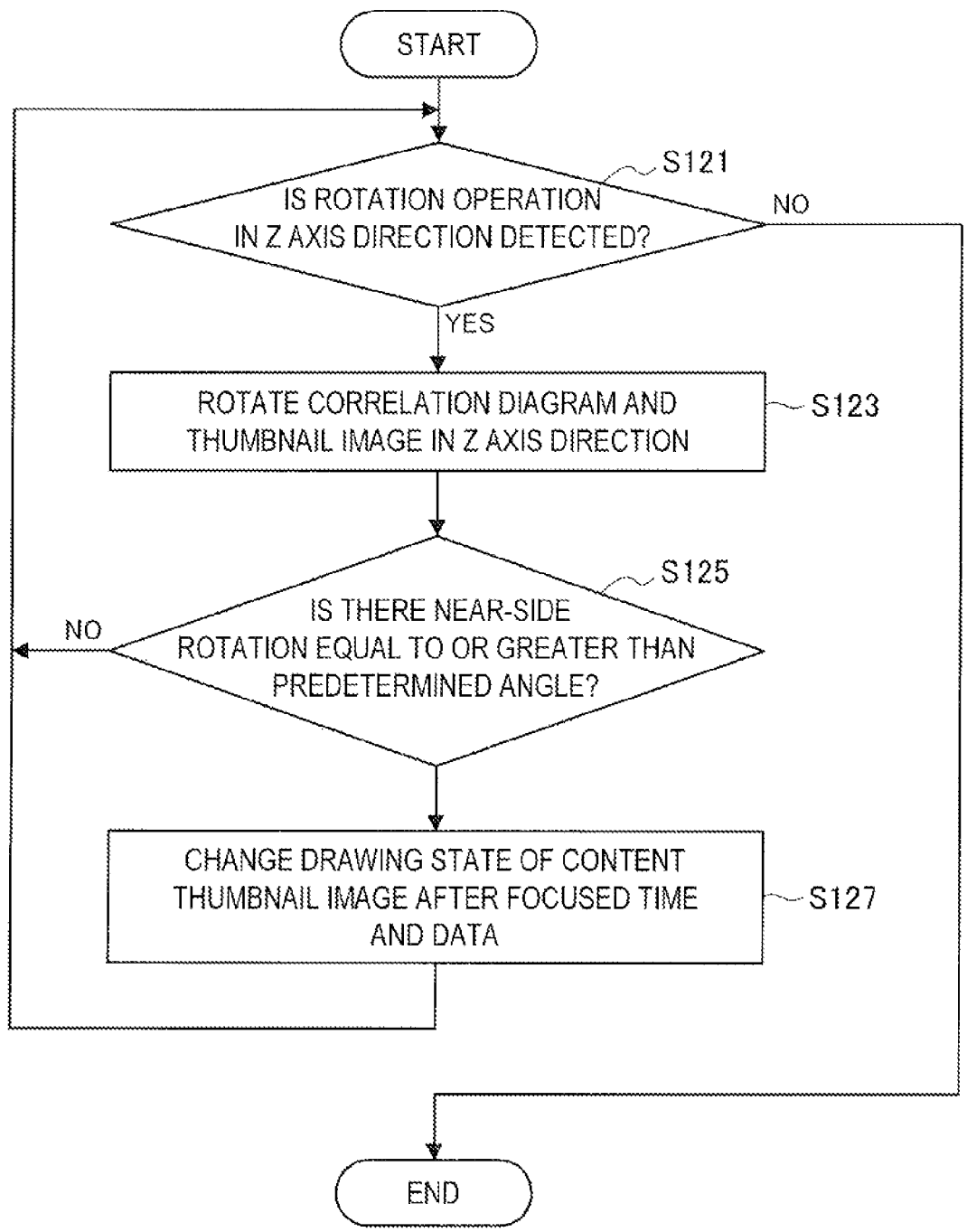

INFORMATION PROCESSING APPARATUS, INFORMATION PROCESSING METHOD AND COMPUTER PROGRAM

CROSS-REFERENCE TO RELATED APPLICATION

The present application claims priority from Japanese Patent Application No. JP 2012-080992 filed in the Japanese Patent Office on Mar. 30, 2012, the entire content of which is incorporated herein by reference.

BACKGROUND

The present disclosure relates to an information processing apparatus, information processing method and a computer program.

As a service to establish a social network on the Internet, a social networking service (SNS) is suggested and used. The SNS is primarily intended to provide interpersonal communication, and provides an opportunity for information exchange to facilitate communication with a friend or an acquaintance and establish a new personal relationship through connection with other people having no direct relationship.

In such an SNS, there is generally known a social graph that extracts and visualizes the relationships between users registered in the SNS. However, such a social graph can display only relationships at a specific moment (for example, the latest relationships).

Also, to grasp an operational state of the SNS, Japanese Patent Laid-Open No. 2009-282574 discloses a technique of generating social graphs at multiple time points, extracting variation points in these social graphs and extracting changes in the graph scale.

SUMMARY

However, the technique disclosed in Japanese Patent Laid-Open No. 2009-282574 is intended to grasp an operational state but incapable of grasping changes in the individual relationships between registered users, which are a social graph element. At the time of grasping changes in the relationships between users, although it is desirable to display pieces of content related to the users together, it becomes easy to grasp the changes by arranging the pieces of content along the time axis instead of simply displaying the pieces of content. Further, at the time of arranging the pieces of content along the time axis and displaying them on a screen, an effective visual effect is requested.

Therefore, the present disclosure provides a new and improved information processing apparatus, information processing method and program that provide an effective visual effect by changing and presenting a display state according to an operation at the time of displaying pieces of content linked to the time on a screen.

According to an embodiment of the present disclosure, there is provided an information processing apparatus including a display controlling unit configured to, at a time of displaying content on a screen, set one axis in a three-dimensional space as a time axis, arrange pieces of content along one or more of the time axes, cause the time axis to be rotatable in a foreground direction and a background direction of the screen with one axis substantially orthogonal to the time axis regarded as a center, and, in a case where the time axis is inclined by a predetermined angle or more toward a foreground, change a display state of content after a predetermined reference time among the pieces of content arranged along the time axis.

With such a configuration, at a time of displaying content on a screen, the display controlling unit sets one axis in a three-dimensional space as a time axis and arranges pieces of content along one or more of the time axes. Also, the display controlling unit causes the time axis to be rotatable in a foreground direction and a background direction of the screen with one axis substantially orthogonal to the time axis regarded as a center, and, in a case where the time axis is inclined by a predetermined angle or more toward a foreground, changes a display state of content after the predetermined reference time among the pieces of content arranged along the time axis. At the time of displaying content linked to the time on the screen, such an information processing apparatus changes and presents the display state according to an operation, thereby presenting effective visual effects.

Further, according to an embodiment of the present disclosure, there is provided an information processing method including display controlling operations of, at a time of displaying content on a screen, setting one axis in a three-dimensional space as a time axis, arranging pieces of content along one or more of the time axes, causing the time axis to be rotatable in a foreground direction and a background direction of the screen with one axis substantially orthogonal to the time axis regarded as a center, and, in a case where the time axis is inclined by a predetermined angle or more toward a foreground, changing a display state of content after a predetermined reference time among the pieces of content arranged along the time axis.

Further, according to an embodiment of the present disclosure, there is provided a computer program for causing a computer to execute display control operations of, at a time of displaying content on a screen, setting one axis in a three-dimensional space as a time axis, arranging pieces of content along one or more of the time axes, causing the time axis to be rotatable in a foreground direction and a background direction of the screen with one axis substantially orthogonal to the time axis regarded as a center, and, in a case where the time axis is inclined by a predetermined angle or more toward a foreground, changing a display state of content after a predetermined reference time among the pieces of content arranged along the time axis.

According to the embodiments of the present disclosure described above, it is possible to provide a new and improved information processing apparatus, information processing method and program that provide an effective visual effect by changing and presenting a display state according to an operation at the time of displaying pieces of content linked to the time on a screen.

BRIEF DESCRIPTION OF THE DRAWINGS

FIG. 3 is an explanatory diagram for explaining generation processing of a correlation diagram according to the embodiment;

FIG. 9 is an explanatory diagram illustrating an example of a familiarity calculation method according to the embodiment;

FIG. 12 is an explanatory diagram illustrating an example of scrolling the time axis in the z axis direction according to a user operation;

FIG. 13 is an explanatory diagram illustrating a control example of rotating the x-y plane with respect to the z axis according to a user operation;

FIG. 15 is an explanatory diagram illustrating an example of displaying content corresponding to a thumbnail image S operated by the user, on a screen;

FIG. 16 is an explanatory diagram illustrating an example of changing the sale of the time axis displayed on a screen, according to a scaling operation by the user;

FIG. 18 is a flowchart illustrating an example of operations of an information processing apparatus 10 according to the present embodiment;

FIG. 19 is a flowchart illustrating an example of operations of the information processing apparatus 10 according to the present embodiment.

DETAILED DESCRIPTION OF THE EMBODIMENT(S)

Figure 1:
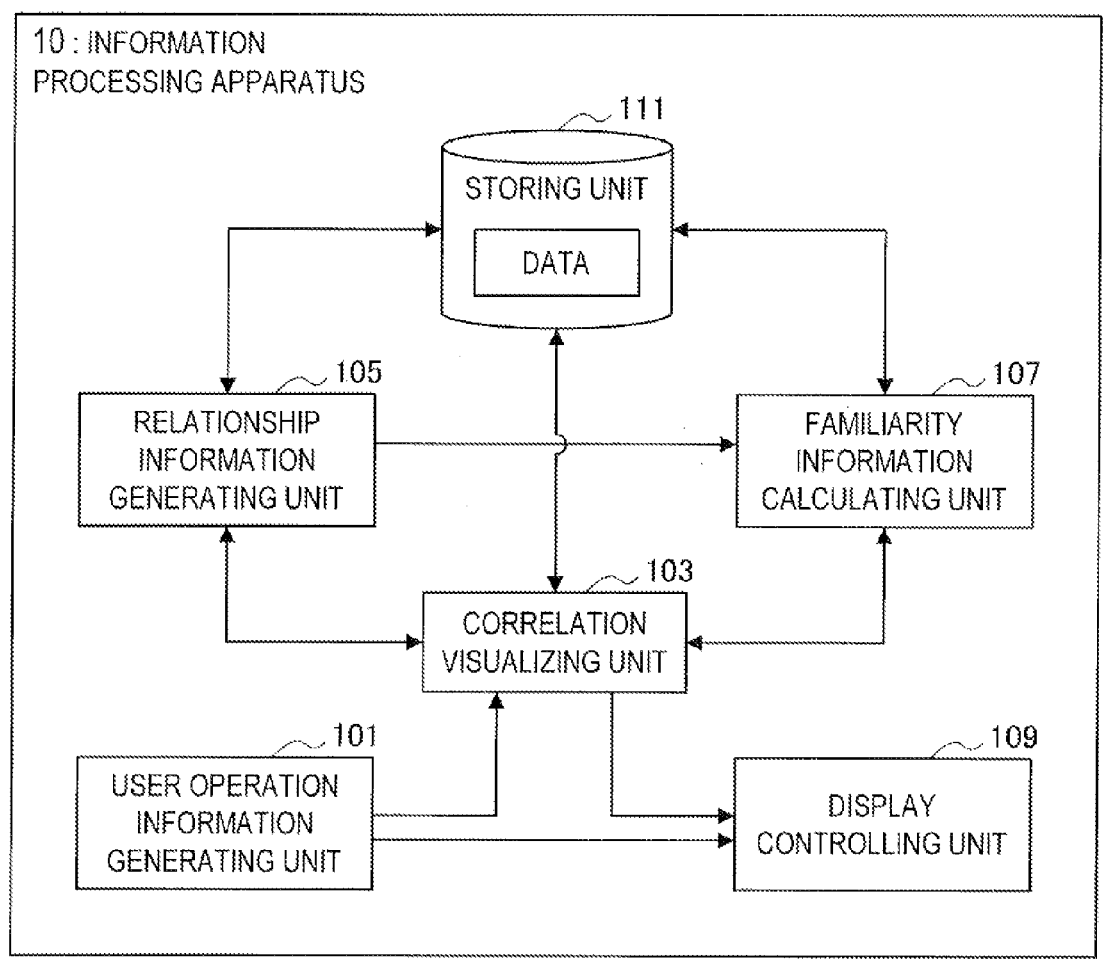
FIG. 1 is a block diagram illustrating a configuration of an information processing apparatus according to the first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, an explanation will be given in the following order.
<1. Embodiment of the present disclosure>
[Functional configuration of information processing apparatus]
[Operations of information processing apparatus]
[Hardware configuration of information processing apparatus]
<2. Conclusion>

1. EMBODIMENT OF THE PRESENT DISCLOSURE

Functional Configuration of Information Processing Apparatus

First, with reference to FIG. 1, a configuration of an information processing apparatus according to an embodiment of the present disclosure will be explained. FIG. 1 is a block diagram illustrating the configuration of the information processing apparatus according to the present embodiment.

Using relationship information and familiarity information calculated based on collection of data including information related to the time (which may be referred to as "data group" below), the information processing apparatus according to the present embodiment generates a correlation diagram to visualize a correlation between an arbitrary character related to the data group and another character related to this character, and time variation in the correlation. Besides, the information processing apparatus according to the present embodiment provides the generated correlation to the user by displaying it on a display apparatus such as a display held in the information processing apparatus or display apparatuses of various devices set outside the information processing apparatus.

Also, the information processing apparatus according to the present embodiment arranges the correlation diagram and information of pictures and motion pictures (which will be collectively referred to as "content") linked to the time on the same space. By arranging the correlation diagram and the content information are arranged on the same space and arranging time variation in character correlations and pieces of content linked to the time on the same space, the information processing apparatus according to the present embodiment can visually present the time variation in the character correlations and the content acquired at each time.

Here, examples of "data including information related to the time" focused on in the present embodiment include: image data such as stationary pictures and motion pictures associated with metadata related to the image generation time; text data such as email, blog, twitter and history information of mobile phone or email, for which the data generation time (or data transmission time and so on) can be specified; and schedule data generated by a schedule management application. The data includes information related to the time of the data itself or metadata associated with the data, and, by focusing on the information related to the time and specifying relative positional relationships of the data, it is possible to specify a time series of the data. Also, when the data is analyzed, the data becomes an information source that can specify a relationship (for example, friend, family, boyfriend or girlfriend, and so on) between certain characters. Also, as the "data including information related to the time," it is possible to use various items of data themselves acquired from an SNS.

Relationship information generated using such data denotes information illustrating the relationship between characters related to a data group in each time point on the time series of the focused data group. This relationship information stores information in a database format, where the information includes that, for example, certain characters are friends, certain characters are a family (or parent and child) and certain characters are a boyfriend and a girlfriend for each other.

Also, familiarity information calculated using the above data denotes information indicating the degree of familiarity between certain characters, and stores information such as a value indicating the degree of familiarity and a level at the time of evaluating the level of the degree of familiarity. For example, such familiarity information may be calculated in which the familiarity of character B seen from character A and the familiarity of character A seen from character B are equal, or it may be calculated in which the familiarity of character B seen from character A and the familiarity of character A seen from character B are different values.

The above data including information related to the time may be held and managed by an information processing apparatus which is explained below, or may be stored various servers present on various networks such as the Internet. Also, the above relationship information and familiarity information may be generated and calculated by the information processing apparatus which is explained below, or may be generated and calculated by various servers present on various networks such as the Internet.

Also, in the following, an explanation will be given to an example case where image data associated with information related to the data generation time is used as data including information related to the time. Also, in the following example, an explanation will be given to a case where the information processing apparatus according to the present embodiment has a generation and calculation function of the above relationship information and familiarity information, but it is not limited to this example.

As illustrated in FIG. 1, the information processing apparatus 10 according to the present embodiment mainly includes a user operation information generating unit 101, a correlation visualizing unit 103, a relationship information generating unit 105, a familiarity information calculating unit 107, a display controlling unit 109 and a storing unit 111.

The user operation information generating unit 101 is realized by, for example, a CPU (Central Processing Unit), ROM (Read Only Memory), RAM (Random Access Memory) or input apparatus. The user operation information generating unit 101 generates user operation information indicating operations (or user operations) performed by the user using input apparatuses such as a key board, mouse, various buttons and touch panel held in an information processing apparatus 10. After generating the user operation information indicating the user operation, the user operation information generating unit 101 outputs the generated user operation information to the correlation visualizing unit 103 and the display controlling unit 109 which are described later.

The correlation visualizing unit 103 is realized by, for example, a CPU, ROM or RAM. Using relationship information and familiarity information calculated based on a data group corresponding to collection of data including information related to the time, the correlation visualizing unit 103 generates a correlation diagram that visualizes: a correlation between one arbitrary character in the data group as a reference character and an associated character who is different from the reference character and who has a relationship with the reference character; and time variation in the correlation. At this time, the correlation visualizing unit 103 extracts one or multiple associated characters from the data group based on the relationship information, and, at each time of the time series, determines the offset distance between a node indicating the reference character and a node indicating the associated character, according to the familiarity information. Besides, taking into account the correlation of the same character between adjacent time points in the time series, the correlation visualizing unit 103 determines an arrangement position of the node indicating the associated character.

Figure 2A:
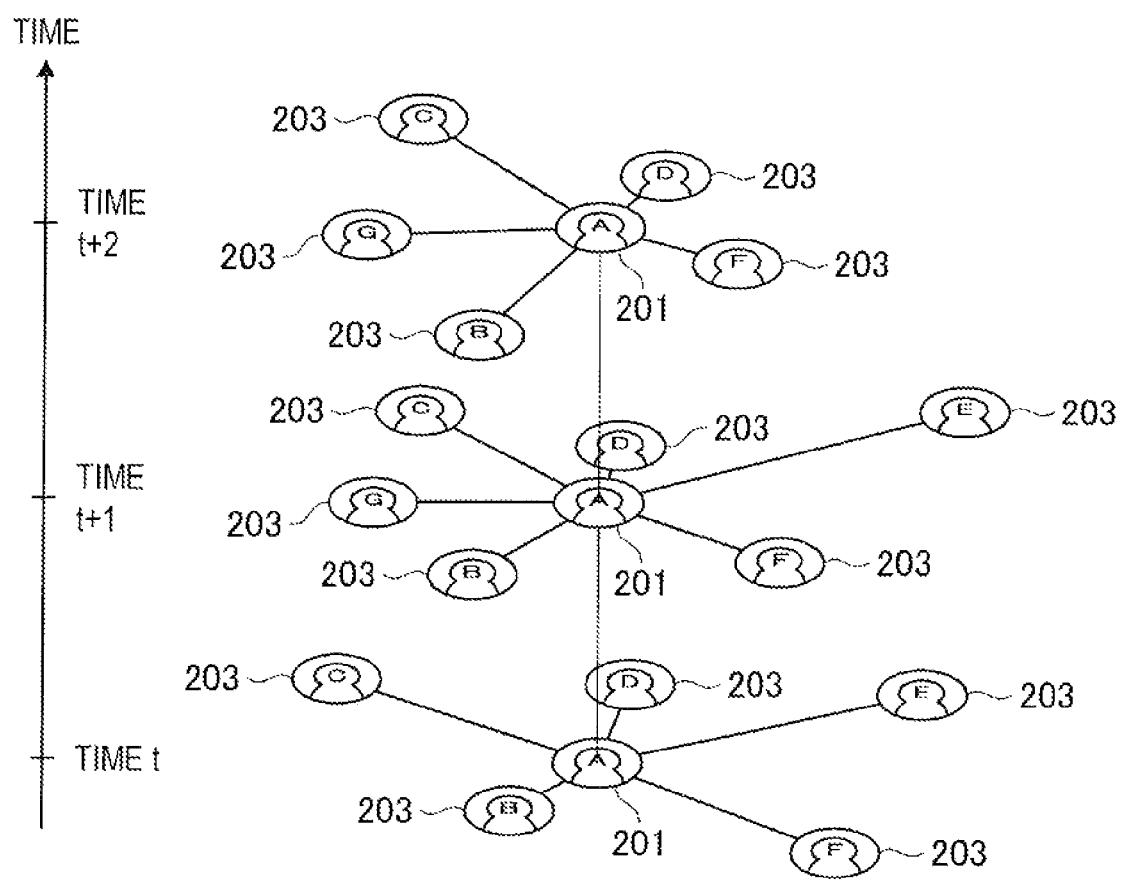
FIG. 2A is an explanatory diagram illustrating a correlation diagram example according to the embodiment.

FIG. 2A is an explanatory diagram illustrating a correlation diagram example according to the present embodiment. As illustrated in FIG. 2A, the correlation diagram according to the present embodiment is generated by focusing on a character as a reference (which may be referred to as "reference character" below) designated by a user operation or the like and extracting characters associated with the reference character (which may be referred to as "associated characters"). To be more specific, the correlation diagram according to the present embodiment has a three-dimensional structure in which correlation plane diagrams are laminated along the time series with respect to the reference character, where each of the correlation plane diagrams connects an object (or reference character object) 201 indicating the reference character at each time point of the time series and an object (or associated character object) 203 indicating each associated character by a segment of a predetermined length. Also, although the example illustrated in FIG. 2A is drawn such that the time axis advances from bottom to top in the figure, it is needless to say that it is drawn such that the time axis advances from top to bottom in the figure.

Also, FIG. 2A illustrates a thumbnail image S of content associated with the reference character and the associated character, in addition to the reference character object 201 and the associated character object 203. The thumbnail image S is displayed at the time point of generating (or imaging) the content on the time series. By constructing the correlation diagram in this way, the information processing apparatus 10 according to the present embodiment can visually present time variation in character correlations in association with the content acquired in each time.

Here, as the reference character object 201 and the associated character object 203, image data such as a thumbnail image of a corresponding character, an illustration of the corresponding character or text data indicating the corresponding character may be used. Also, in the case of using image data as the reference character object 201 and the associated character object 203, it is preferable to use an image cut out from the most suitable image data (for example, image data generated on the time and date closest to the focused time point) in the focused time point in the time series. In this way, a character image displayed according to the time-series transition changes, thereby helping the user's instinctive understanding.

The correlation diagram generated by the correlation visualizing unit 103 and the content thumbnail S are displayed on a display apparatus connected to the information processing apparatus 10 by the display controlling unit 109 which is described later. Subsequently, the correlation diagram generated by the correlation visualizing unit 103 and the content thumbnail S are changed based on the user operation information, which is reported from the user operation information generating unit 101 to the display controlling unit 109, and displayed on the display apparatus.

Display control of the correlation diagram and the content thumbnail by the display controlling unit 109 will be described later in detail.

Figure 2B:
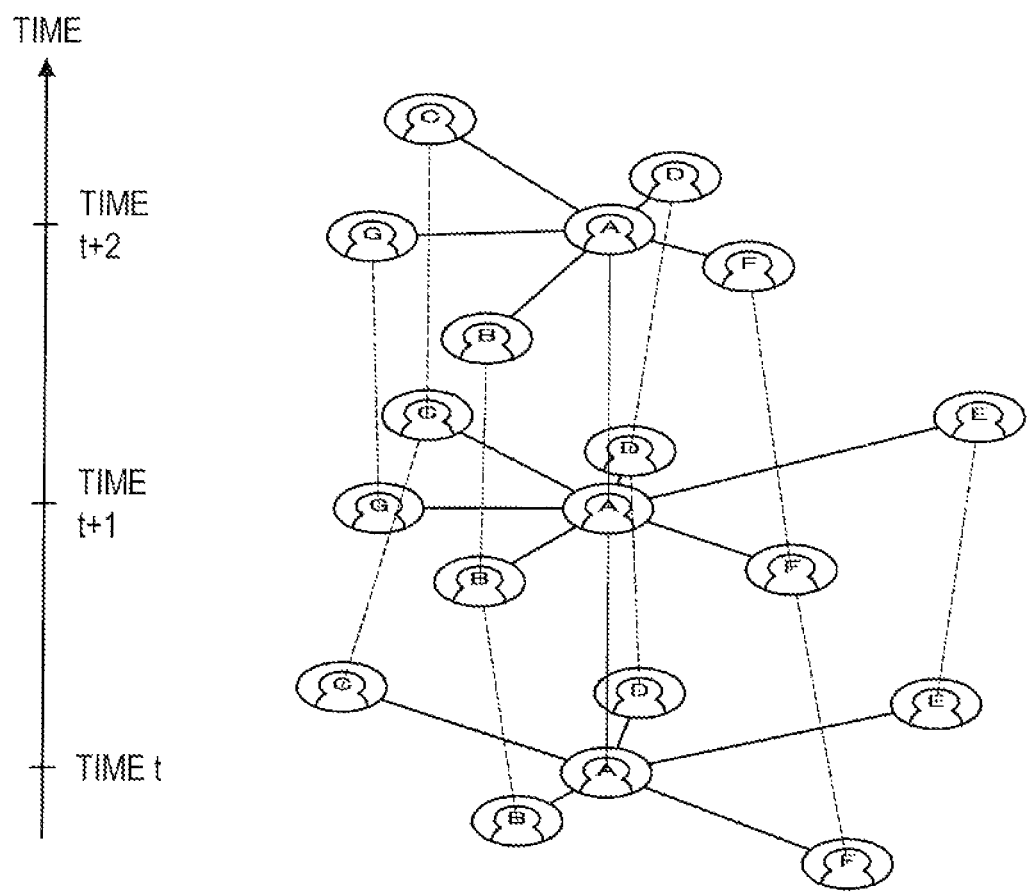
FIG. 2B is an explanatory diagram illustrating a correlation diagram example according to the embodiment.

Also, as exemplified in FIG. 2B, the correlation diagram generated by the correlation visualizing unit 103 may be displayed including an auxiliary line connecting the same character between time points. Since such an auxiliary line is displayed together, the user can easily grasp how a relative position of an associated character object with respect to the reference character object transitions over time (in other words, how the correlation between the reference character and the associated character transitions).

To generate such a correlation diagram, first, the correlation visualizing unit 103 generates the correlation plane diagram at each time point of the time series as exemplified in FIG. 3. When user operation information requesting a generation start of a correlation diagram is output from the user operation information generating unit 101, the correlation visualizing unit 103 displays a message to inquire who becomes a reference character, on a display screen through the display controlling unit 109 which is described later, so as to cause the user to designate the reference character. When user operation information related to the reference character is output from the user operation information generating unit 101, based on the acquired information related to the reference character, the relationship information generating unit 105 which is described later is requested to generate relationship information at time t and the familiarity information calculating unit 107 which is described later is requested to calculate familiarity information at time t.

When acquiring the relationship information and the familiarity information at time t, the correlation visualizing unit 103 refers to the relationship information and specifies who is a character associated with the reference character (i.e. associated character). The correlation visualizing unit 103 uses the object 203 corresponding to the specified associated character, as a node in the correlation plane diagram. In the example illustrated in FIG. 3, character A is set as the reference character, and, with reference to association information, the correlation visualizing unit 103 specifies five characters B to F as associated characters at time t.

Next, the correlation visualizing unit 103 refers to the familiarity information at time t and specifies the degree of familiarity between the reference character and each associated character. Besides, depending on the specified degree of familiarity, the correlation visualizing unit 103 determines a length of a segment (or edge) 205 connecting the reference character object 201 and the associated character object 203. Here, the correlation visualizing unit 103 may shorten the length of the edge 205 as the familiarity is higher, or, by contrast, the correlation visualizing unit 103 may lengthen the length of the edge 205 as the familiarity is higher. In the example illustrated in FIG. 3, the correlation visualizing unit 103 uses a length normalizing the familiarity described in the familiarity information, as the length of the edge 205.

The correlation visualizing unit 103 selects an associated character used to generate the correlation plane diagram, determines the length of the edge 205 with respect to the selected associated character and determines how each associated character object 203 is arranged. As a method of determining the arrangement of the associated character object 203, although it is possible to use all known graph drawing methods, the correlation visualizing unit 103 can determine an arrangement position of the associated character object 203 according to a method using a spring model disclosed in Peter Eades, "A heuristic for graph drawing", Congressus Numerantium, 1984, 42, p. 149-160, for example.

The method using the spring model disclosed in Peter Eades, "A heuristic for graph drawing", Congressus Numerantium, 1984, 42, p. 149-160 is a method of using nodes (corresponding to the reference character object 201 and the associated character object 203 in the present embodiment) as mass points, using an edge as a spring of a predetermined length (corresponding to a length normalizing familiarity in the present embodiment) and determining the arrangement of each node such that the energy of the whole system is the lowest. Therefore, in the example at time t illustrated in FIG. 3, a physics model formed with six mass points and five springs is considered and five mass points (i.e. mass points corresponding to associated character objects 203) are determined such that an equation to find the energy of the whole system has the minimum value.

When generating the correlation plane diagram at time t, the correlation visualizing unit 103 similarly generates a correlation plane diagram at time (t+1). At this time, taking into account a correlation of the same character between adjacent time points in the time series, the correlation visualizing unit 103 adjusts conditions to determine the arrangement of objects of the same character such that the positions of the objects become close to each other. For example, in the case of determining the arrangement of objects using the above spring model, the correlation visualizing unit 103 acts a force on mass points such that the object of the corresponding same character becomes close to the position of the object in the previous time, instead of setting the object so as to be provided in the same position.

Figure 4:
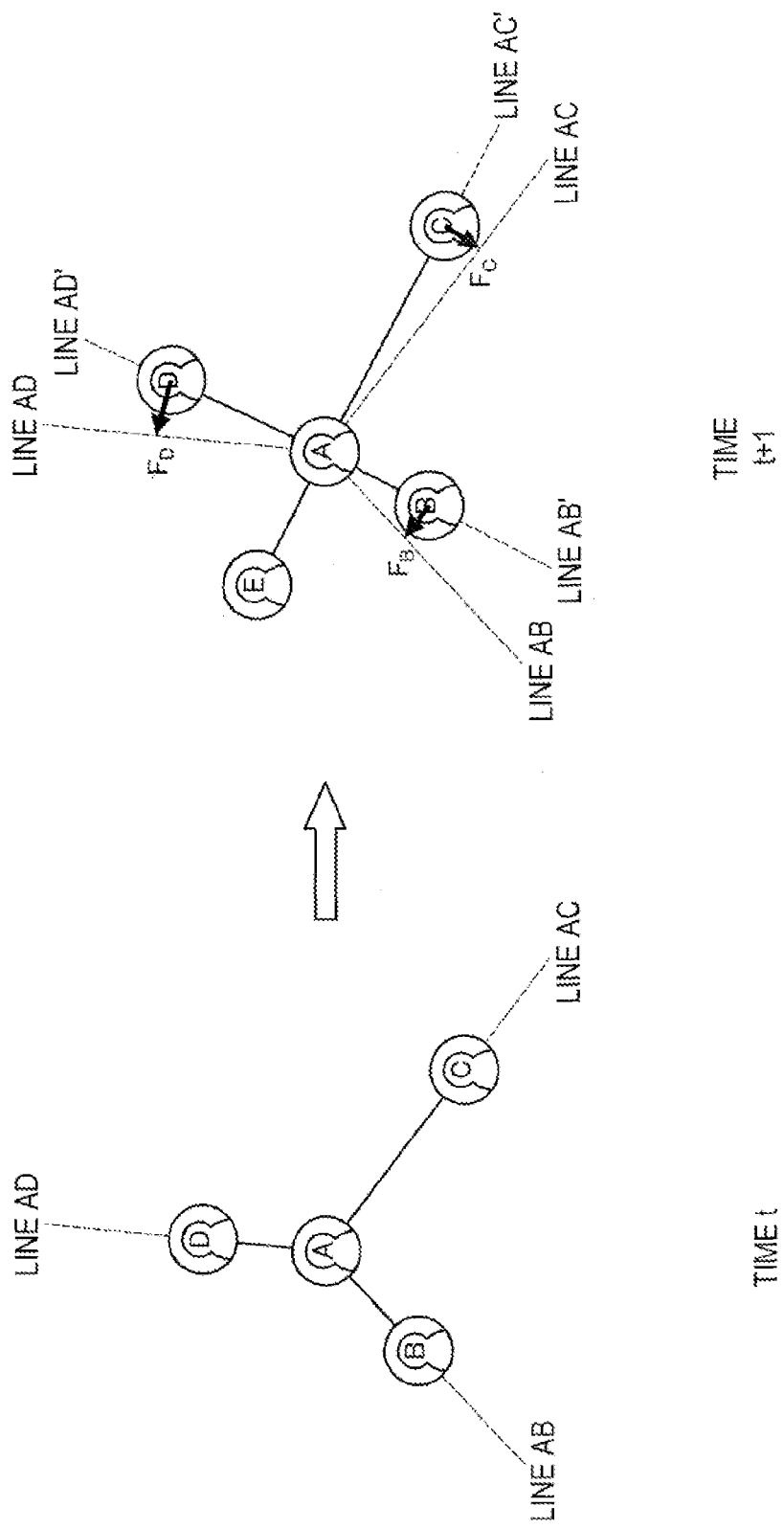
FIG. 4 is an explanatory diagram for explaining generation processing of a correlation diagram according to the embodiment.

For example, as illustrated in FIG. 4, it is assumed that a correlation plane diagram is generated in which character A is a reference character and characters B to D are associated characters. At the time of generating the correlation plane diagram at time (t+1), the correlation visualizing unit 103 acts a force to the mass points such that the associated character objects become close to the positions of the objects in previous time t. That is, at the time point of time (t+1) in FIG. 4, when it is assumed that the initial position of character B is represented by line AB' and the position of character B at time t is represented by line AB, the correlation visualizing unit 103 performs a computation to determine the arrangement with an assumption that force FD directed from line AB' to line AB is acted on the mass point corresponding to character B. Also, the correlation visualizing unit 103 similarly acts a force on characters C and D and determines the arrangement of each associated character object.

Also, as illustrated in FIG. 3 and FIG. 4, there may occur a case where a character who is not selected as an associated character at time t is selected as an associated character at time (t+1). In such a case, although the correlation visualizing unit 103 can initially arrange the object 203 corresponding to the newly selected associated character in an arbitrary position, the initial position may be determined with reference to arbitrary knowledge such as a personal relationship or familiarity between the newly selected associated character and an existing associated character, and a probability (or co-occurrence probability) that the newly selected associated character, the existing associated character and the reference character are included in the same data.

By sequentially implementing such processing on focused time ranges, the correlation visualizing unit 103 can generate the correlation plane diagrams as illustrated in FIG. 3.

Also, a method of determining the arrangement of the associated character object 203 is not limited to the above example and it is possible to use a known graph drawing method. Examples of such a graph drawing method include various methods as disclosed in G. Di Battista, P. Eades, R. Tamassia, I. G. Tolis, "Algorithms for Drawing Graphs: an Annotated Bibliography", Computational Geometry: Theory and Applications, 1994, 4, p. 235-282.

Also, for example, the correlation visualizing unit 103 may use relationship information and familiarity information strictly corresponding to time t at the time of generating the correlation plane diagram at time t, or may generate the correlation plane diagram by using relationship information and familiarity information corresponding to a provided range of time t, for example, a range between t−Δt and t+Δt as information in time t. Thus, by providing a range of the focused time, it is possible to utilize more knowledge related to the relationship and familiarity between characters, and it is possible to generate a more accurate correlation plane diagram.

After generating the correlation plane diagrams as illustrated in FIG. 3, the correlation visualizing unit 103 generates a correlation diagram having a three-dimensional structure as illustrated in FIG. 2A or 2B, by laminating the correlation plane diagrams in order of time such that the reference character objects 201 are positioned on the same straight line.

Figure 5:
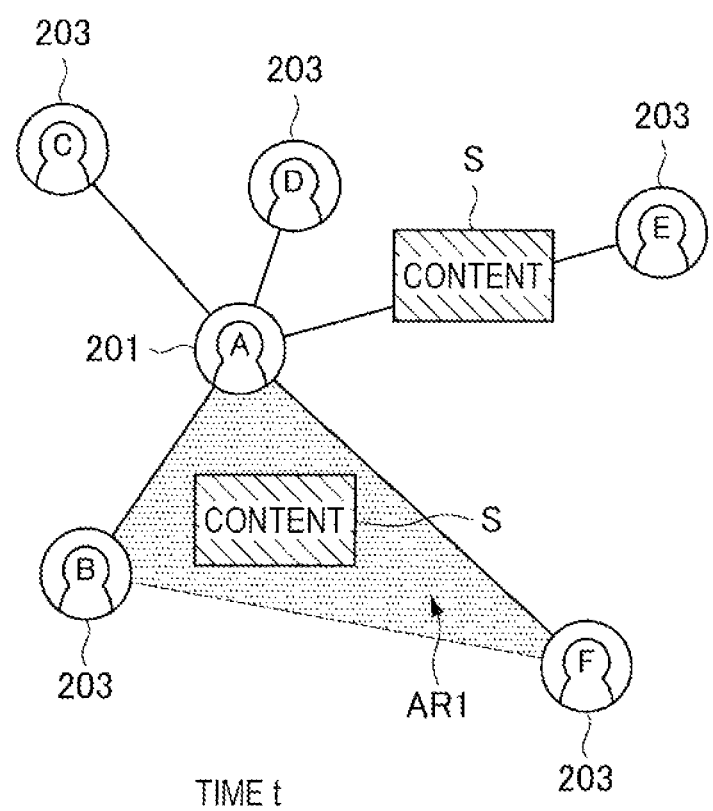
FIG. 5 is an explanatory diagram for explaining generation processing of a correlation diagram according to the embodiment.
Figure 6A:
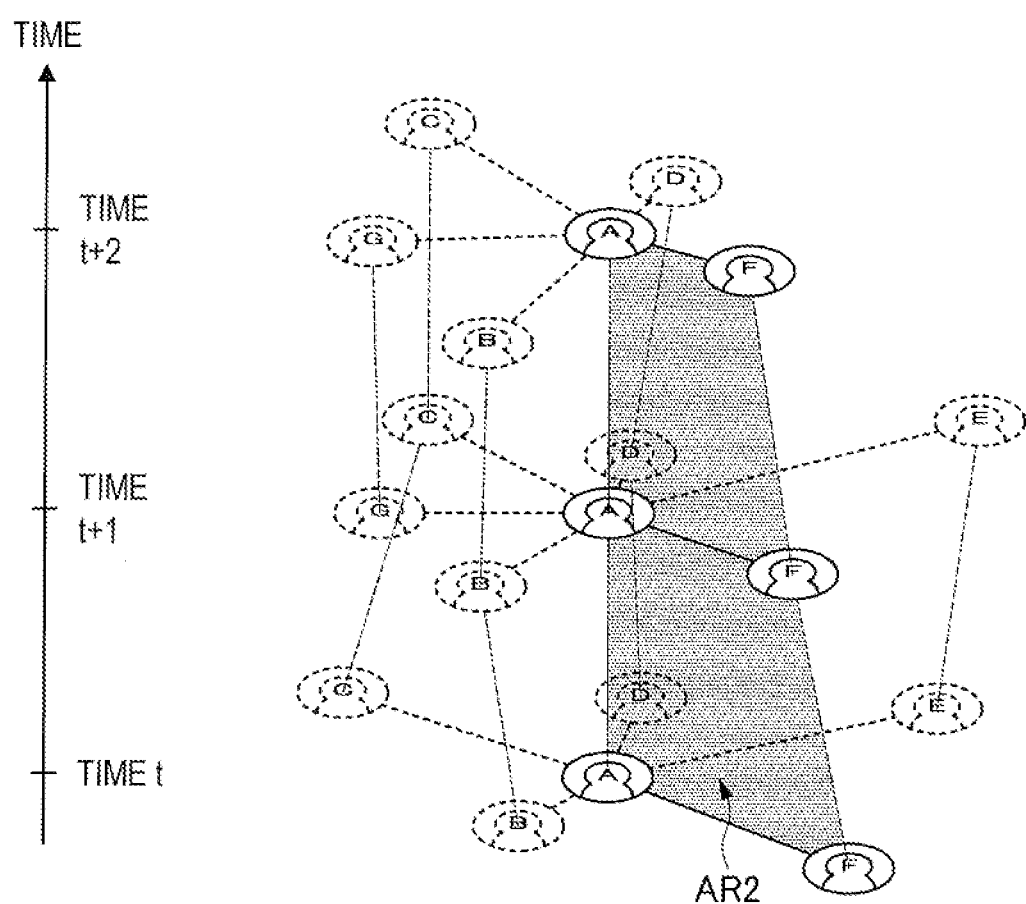
FIG. 6A is an explanatory diagram for explaining generation processing of a correlation diagram according to the embodiment.
Figure 6B:
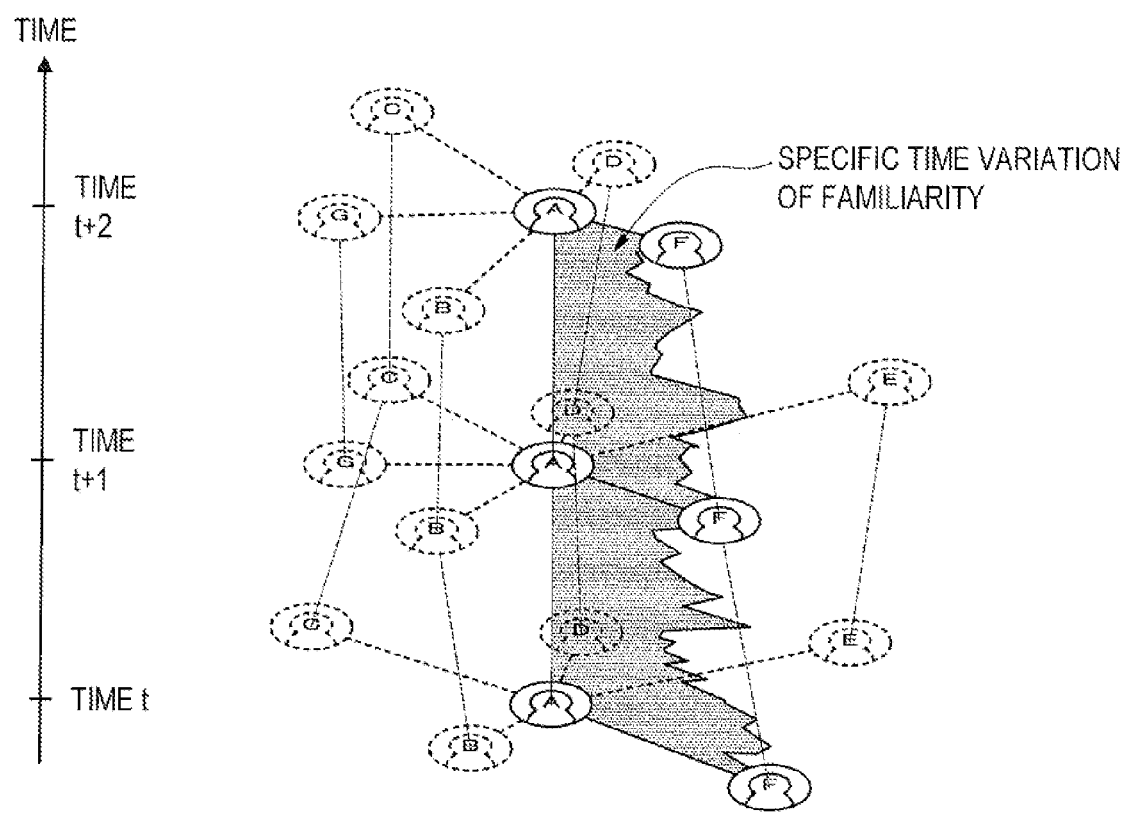
FIG. 6B is an explanatory diagram for explaining generation processing of a correlation diagram according to the embodiment.

Also, for example, as illustrated in FIG. 5, the correlation visualizing unit 103 may give a color to a shape (for example, the shape of area AR1 in FIG. 5) and emphatically display it, where the shape is defined by the reference character object and associated character objects which are considered, based on relationship information, to belong to the same group.

The relationship information generating unit 105 is realized by, for example, a CPU, ROM or RAM. Using collection of data including information related to the time, the relationship information generating unit 105 generates relationship information indicating the relationship between characters related to the above collection of data (e.g. which appear on the above collection of data) at each time point of the time series.

Here, for example, at the time of generating the relationship information at time t, the relationship information generating unit 105 may generate the relationship information using time information which is associated with a data group and which strictly corresponds to time t, or may generate the relationship information using a data group corresponding to a provided range of time t, for example, a range of time information between t−Δt and t+Δt. Thus, by providing a range of the focused time, it is possible to utilize more knowledge related to the relationship between characters, and it is possible to generate more accurate relationship information.

Also, a method of generating the relationship information in the relationship information generating unit 105 is not specifically limited, and, for example, it is possible to use all known methods such as a technique disclosed in Japanese Patent Laid-Open No. 2010-16796.

The familiarity information calculating unit 107 is realized by, for example, a CPU, ROM or RAM. Using collection of data including information related to the time, the familiarity information calculating unit 107 generates familiarity information indicating the degree of familiarity between characters related to the above collection of data (e.g. which appear on the above collection of data) at each time point of the time series.

Here, for example, at the time of generating the familiarity information at time t, the familiarity information calculating unit 107 may calculate the familiarity information using time information which is associated with a data group and which strictly corresponds to time t, or may calculate the familiarity information using a data group corresponding to a provided range of time t, for example, a range of time information between t−Δt and t+Δt. Thus, by providing a range of the focused time, it is possible to utilize more knowledge related to the familiarity between characters, and it is possible to generate more accurate familiarity information.

Also, a method of generating the familiarity information in the familiarity information calculating unit 107 is not specifically limited, and, for example, it is possible to use all known methods such as a technique disclosed in Japanese Patent Laid-Open No. 2010-16796.

The display controlling unit 109 is realized by, for example, a CPU, ROM, RAM, communication apparatus or output apparatus. The display controlling unit 109 performs display control of a display screen in a display apparatus such as a display provided in the information processing apparatus 10 and a display provided outside the information processing apparatus 10. This display controlling unit 109 implements the display control of the display screen based on user operation information reported from the user operation information generating unit 101 and information related to a correlation diagram reported from the correlation visualizing unit 103, and so on. Also, the display controlling unit 109 performs display control to change a display state of the correlation diagram according to a user operation with respect to the correlation diagram displayed on the display screen. The display control to change the display state of the correlation diagram by the display controlling unit 109 will be described later in detail.

The storing unit 111 is an example of a storage apparatus provided in the information processing apparatus 10 according to the present embodiment. The storing unit 111 may store various kinds of data held in the information processing apparatus 10 and metadata associated such data. Also, the storing unit 111 may store data corresponding to various kinds of information generated by the relationship information generating unit 105 and the familiarity information calculating unit 107 or various kinds of data generated by an external information processing apparatus. Also, the storing unit 111 may store execution data corresponding to various applications used to display various kinds of information on a display screen by the correlation visualizing unit 103 or the display controlling unit 109. Also, this storing unit 111 may adequately store various parameters or processing process requested to be stored when the information processing apparatus 10 performs some processing, or various databases. In this storing unit 111, each processing unit held in the information processing apparatus 10 according to the present embodiment can freely perform reading and writing.

Also, functions of the user operation information generating unit 101, the correlation visualizing unit 103, the relationship information generating unit 105, the familiarity information calculating unit 107, the display controlling unit 109 and the storing unit 111 may be mounted on any hardware as long as they can transmit/receive information to/from each other via a network. Also, processing implemented by a certain processing unit may be realized by one piece of hardware or realized by distributed processing by multiple items of hardware.

An example of functions of the information processing apparatus 10 according to the present embodiment has been described above. Each component described above may be configured using a general-purpose member or circuit, or may be configured by hardware specialized in the function of each component. Also, all functions of each component may be performed by a CPU or the like. Therefore, depending on technical levels at the times of implementing the present embodiment, a used configuration can be adequately changed.

Also, it is possible to create a computer program to realize each function of the information processing apparatus according to the present embodiment as described above and implement it on a personal computer or the like. Also, it is possible to provide a computer-readable storage medium storing such a computer program. The storage medium is, for example, a magnetic disc, an optical disc, a magnetic optical disc or a flash memory. Also, the above computer program may be distributed via, for example, a network, without using the storage medium.

The functional configuration of the information processing apparatus according to an embodiment of the present disclosure has been described above. Next, an example of a configuration of the relationship information generating unit 105 according to the present embodiment will be explained.

Figure 7:
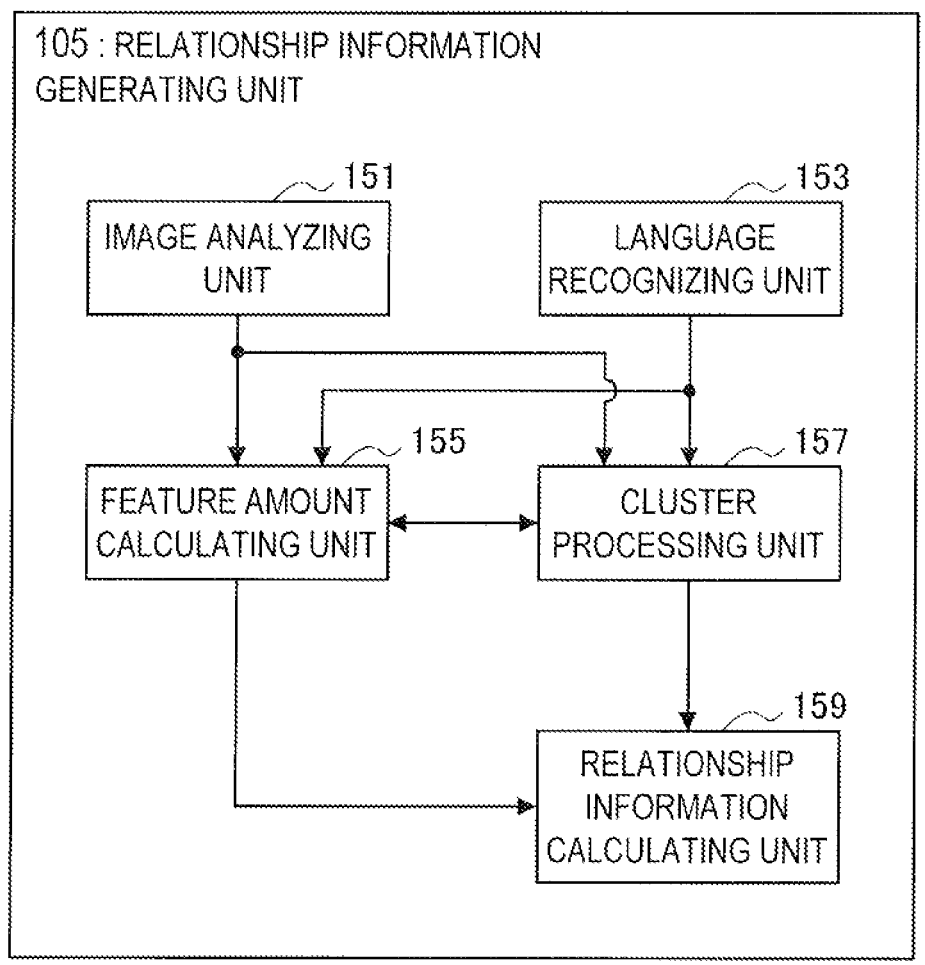
FIG. 7 is a block diagram illustrating a relationship information generating unit according to the embodiment.

FIG. 7 is a block diagram illustrating an example of the configuration of the relationship information generating unit 105 according to the present embodiment. As exemplified in FIG. 7, the relationship information generating unit 105 according to the present embodiment further includes an image analyzing unit 151, a language recognizing unit 153, a feature amount calculating unit 155, a cluster processing unit 157 and a relationship information calculating unit 159.

The image analyzing unit 151 is realized by, for example, a CPU, ROM or RAM. The image analyzing unit 151 analyzes data related images among a data group used at the time of generating relationship information, and detects and recognizes a facial part included in the images. For example, the image analyzing unit 151 can output the face position of each object detected from an image of the processing target, as an X-Y coordinate value in the image, for example. Also, the image analyzing unit 151 may output the size (i.e. width and height) of the detected face and the posture of the detected face. A face area extracted by the image analyzing unit 151 may be stored as, for example, another thumbnail image file cutting only a face area part. When the analysis processing of data related to images is finished, the image analyzing unit 151 outputs an acquired analysis result to the feature amount calculating unit 155 and the cluster processing unit 157 which are described later.

The language recognizing unit 153 is realized by, for example, a CPU, ROM or RAM. The language recognizing unit 153 implements language recognition processing on a data group, which is used at the time of generating relationship information and includes text data, recognizes a text described in the data and grasps described content. When the language recognition processing on the text data is finished, the language recognizing unit 153 outputs an acquired recognition result to the feature amount calculating unit 155 and the cluster processing unit 157 which are described later.

The feature amount calculating unit 155 is realized by, for example, a CPU, ROM or RAM. Using the analysis result of the data group by the image analyzing unit 151 and the language recognition result of the data group by the language recognizing unit 153, the feature amount calculating unit 155 calculates various feature amounts characterizing characters associated with the focused data group, in cooperation with the cluster processing unit 157 which is described later. After calculating the various feature amounts, the feature amount calculating unit 155 outputs an acquired result to the cluster processing unit 157 and the relationship information calculating unit 159 which are described later.

The cluster processing unit 157 is realized by, for example, a CPU, ROM or RAM. In cooperation with the feature amount calculating unit 155, the cluster processing unit 157 implements clustering processing on the image analysis result by the image analyzing unit 151, the language recognition result by the language recognizing unit 153 and the various feature amounts calculated by the feature amount calculating unit 155. Also, the cluster processing unit 157 can implement various kinds of preprocessing on data subject to the clustering processing or implement various kinds of post-processing on a result acquired by the clustering processing. When the clustering processing on various kinds of data is finished, the cluster processing unit 157 outputs an acquired result to the relationship information calculating unit 159 which is described later.

The relationship information calculating unit 159 is realized by, for example, a CPU, ROM or RAM. Using the various feature amounts calculated by the feature amount calculating unit 155 and the clustering result by the cluster processing unit 157, the relationship information calculating unit 159 calculates relationship information indicating a personal relationship between characters associated with a focused data group. After calculating the relationship information related to the focused data group using such information, the relationship information calculating unit 159 outputs an acquired result to the correlation visualizing unit 103.

Next, a specific flow of the relationship information generation processing implemented by the relationship information generating unit 105 having such a processing unit will be simply explained using an example of performing processing on an image data group.

First, the image analyzing unit 151 of the relationship information generating unit 105 implements image analysis processing on an image data group of the processing target and extracts faces included in the image data group. Also, according to the face extraction, the image analyzing unit 151 may generate a thumbnail image including the extracted face part. When the analysis of the image data group is finished, the image analyzing unit 151 outputs an acquired result to the feature amount calculating unit 155 and the cluster processing unit 157.

Using the face images extracted by the image analyzing unit 151, the feature amount calculating unit 155 calculates the face feature amounts and similarity of the face images or estimates the age and gender of the corresponding characters. Also, based on the similarity calculated by the feature amount calculating unit 155, the cluster processing unit 157 implements face clustering processing to classify the extracted faces or implements image time clustering processing to classify the images into time clusters.

Next, the cluster processing unit 157 implements error removal processing of the face clusters. This error removal processing is performed using the face feature amounts calculated by the feature amount calculating unit 155. There is a high possibility that, if the face feature amounts indicating the face attribute values are largely different between face images, they are face images of different characters.

Therefore, in a case where face images having largely different face feature amounts are included in the face clusters classified by the face clustering, the cluster processing unit 157 implements error removal processing to remove such face images.

Next, the feature amount calculating unit 155 calculates the face feature amount per face cluster, using the face clusters subjected to the error removal processing. There is a high possibility that face images included in the face clusters from which errors are removed are the same character. Therefore, using the face feature amount every face image calculated in advance, the feature amount calculating unit 155 can calculate the face feature amount per face cluster. The face feature amount per face cluster calculated in this time may be an average value of face feature amounts of face images included in the face cluster, for example.

Next, the cluster processing unit 157 implements character calculation processing every time cluster. Here, the time cluster indicates the collection by event-unit clustering based on the time and date on which images are taken, for example. Examples of such events include a "sports festival," "travel" and "party." In images taken in such events, there is a high possibility that the same character and the same group repeatedly appear. Also, since the event indicates the collection by clustering based on the time, by performing character calculation processing to specify the same character every time cluster, it is possible to improve the accuracy of character calculation. To be more specific, the cluster processing unit 157 can perform face cluster integration processing by using the face feature amount per face cluster. The cluster processing unit 157 can regard face clusters, in which the face feature amounts are close and which do not appear on the same image, as one character and integrate them.

Subsequently, the cluster processing unit 157 implements character group calculation processing every time cluster. There is a high possibility that the same group repeatedly appears on images classified into the same event. Therefore, the cluster processing unit 157 classifies appearance characters into groups using character information calculated per time cluster. In this way, there is a high possibility that a character group calculated per time cluster is very accurate.

Next, the cluster processing unit 157 implements character and character group calculation processing per time cluster. This character and character group calculation processing per time cluster denotes processing of improving the calculation accuracy by using, for example, character information and character group information together. The cluster processing unit 157 can implement reintegration of groups and accordingly implement reintegration of characters, from a configuration (e.g. head count, male-to-female ratio and ratio of age) of a face cluster group included in a character group, for example.

Also, by the above processing, when the character information and the character group information every time cluster are generated, the cluster processing unit 157 implements integration processing of characters and character groups. In the character and character group integration processing, the cluster processing unit 157 can specify a character and a character group over time clusters. At this time, furthermore, the cluster processing unit 157 can improve the accuracy of specifying characters and character groups by using the estimated birth year calculated based on the image shooting date and time and the face feature amount per face cluster. According to this character and character group integration processing, since groups specified for time clusters are integrated, it is possible to acquire information related to the group configuration transition over time.

Next, the relationship information calculating unit 159 implements calculation processing of interpersonal relationship information using the character information and character group information acquired by the character and character group integration processing. The relationship information calculating unit 159 decides a group type from a character group configuration, for example, and calculates a personal relationship based on the attribute value of each character in the group. Examples of the personal attribute value used at this time include a gender and age.

An example of the configuration of the relationship information generating unit 105 according to the present embodiment has been described above. Next, an example of familiarity information calculation processing implemented by the familiarity information calculating unit 107 will be simply explained. In the following, with reference to FIG. 8 and FIG. 9, an example of the familiarity information calculation processing implemented by the familiarity information calculating unit 107 will be explained.

Figure 8:
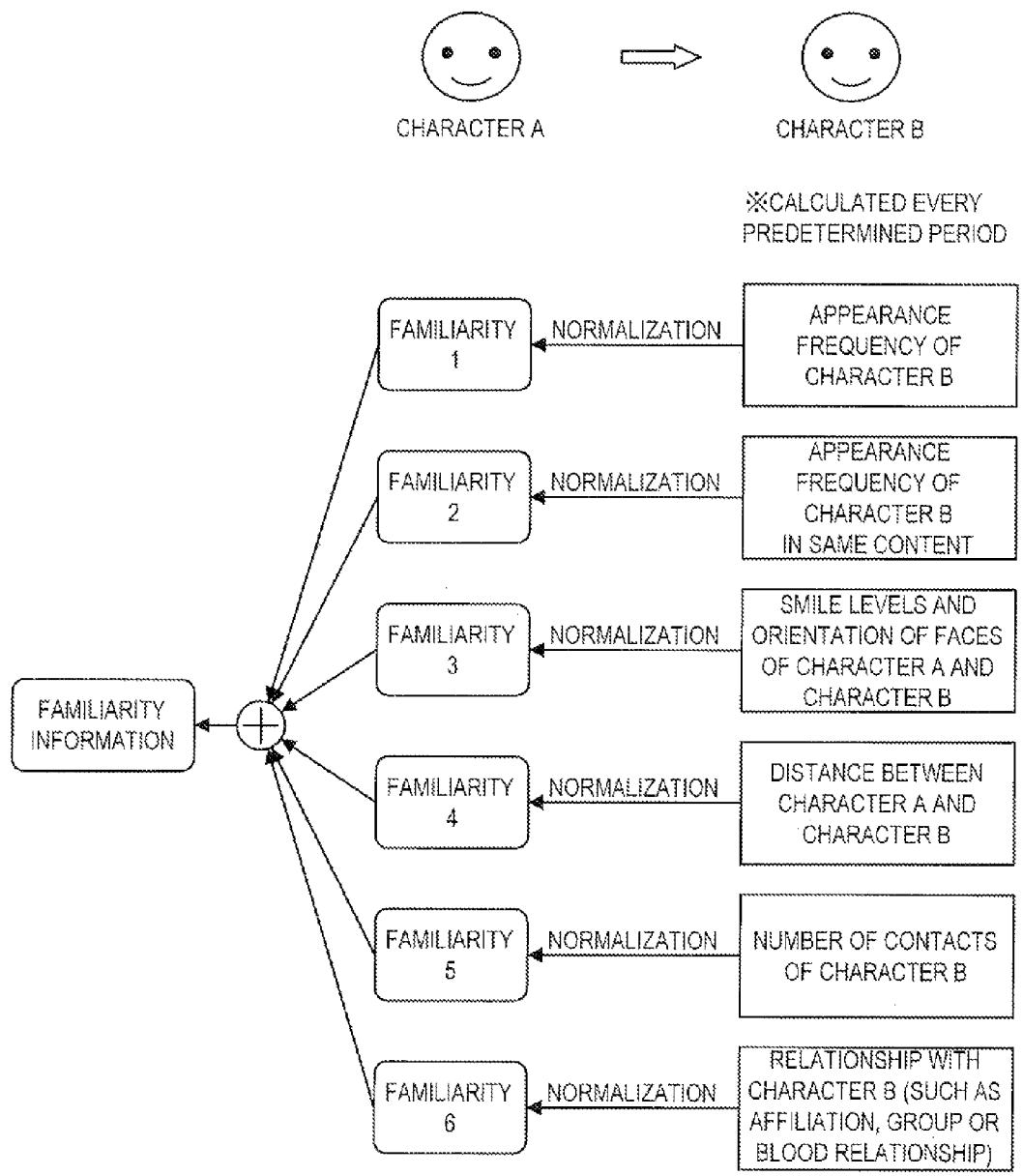
FIG. 8 is an explanatory diagram illustrating an example of a familiarity calculation method according to the embodiment.

FIG. 8 illustrates an example of calculating the familiarity of character B seen from character A. In FIG. 8, in the case of performing processing on an image data group, by calculating the familiarity of character B seen from character A from six viewpoints and adding normalized familiarities, familiarity information of character B seen from character A is acquired. This familiarity information is calculated every predetermined period.

Using a data group stored in the storing unit 111 which is described later and character information related to characters including relationship information generated by the data analysis or the like by the relationship information generating unit 105, the familiarity information calculating unit 107 processes a value normalizing the appearance frequency of character B in images, as "familiarity 1." When there are a plurality of characters in the same place, as interpersonal familiarity is higher, there is a high possibility that they are imaged as objects in pieces of content such as pictures and motion pictures. Therefore, familiarity 1 has a larger value as a ratio of character B included as an object is higher with respect to the total number of pieces of content generated in a predetermined period which is a calculation period, for example.

Also, using the above character information, the familiarity information calculating unit 107 processes a value normalizing the appearance frequency of characters A and B in the same content, as "familiarity 2." When there are a plurality of characters in the same place, as interpersonal familiarity is higher, there is a high possibility that they are imaged in pictures or motion pictures. Therefore, familiarity 2 has a larger value as a ratio of characters A and B included as objects in the same content is higher with respect to the total number of pieces of content generated in a predetermined period which is a familiarity calculation period, for example.

Also, using the above character information, the familiarity information calculating unit 107 calculates "familiarity 3" based on the smile levels and orientation of faces of characters A and B. As the familiarity between characters A and B is higher, it is considered that the smile level is higher when they stick together. Therefore, such familiarity 3 has a larger value as the smile level between characters A and B is higher. Also, as the familiarity between characters A and B is higher, there can be a high probability that their faces face each other when they stick together. Therefore, familiarity 3 has a larger value as there is a higher probability that the faces of characters A and B face each other.

Also, regarding a method of calculating a smile level or a probability that faces face each other, it is possible to use all known methods such as a technique disclosed in Japanese Patent Laid-Open No. 2010-16796.

Also, using the above character information, the familiarity information calculating unit 107 calculates "familiarity 4" based on the distance between characters A and B in an image. Each person has a personal space. This personal space denotes a physical distance to a communicating party. Although this distance varies between persons, it has a nature that it becomes shorter as a relationship with the party is closer, that is, the familiarity is higher. Therefore, familiarity 4 has a larger value as a physical distance between characters A and B in an image is closer.

Also, using various kinds of data (especially, email, blog, schedule or history information such as call history and incoming call history) stored in the storing unit 111 which is described later, the familiarity information calculating unit 107 calculates "familiarity 5" based on the number of contacts between characters A and B in a predetermined period. For example, as this number of contacts, it is possible to set a value adding, for example, the number of transmitted/received emails or calls between characters A and B, the number of times character B appears on a blog of character A, and the number of times character B appears on a schedule of character A.

Also, the familiarity information calculating unit 107 calculates "familiarity 5" based on a relationship between characters A and B. This familiarity 5 can be calculated using, for example, the relationship information generated by the relationship information generating unit 105. By referring to the relationship information, the familiarity information calculating unit 107 can specify the relationship between characters A and B. For example, when acquiring information that the relationship between characters A and B is spouses, the familiarity information calculating unit 107 refers to a familiarity conversion table as illustrated in FIG. 9. The familiarity conversion table denotes information indicating correspondence relationships between interpersonal relationships and familiarity addition levels, for example. In a case where the relationship between characters A and B is spouses as described above, according to this familiarity conversion table, the familiarity addition level is large. Here, although the familiarity addition level is represented by "large," "medium" and "small," specific numerical values may be used. Based on this familiarity addition level, the familiarity information calculating unit 107 sets a larger value of familiarity 5 as the familiarity addition is larger.

Subsequently, the familiarity information calculating unit 107 generates familiarity information by adding these normalized familiarities 1 to 6. Here, the familiarity information calculating unit 107 may weight the values of these familiarities 1 to 6 and then add the results. Also, in a case where there is familiarity that is not able to be calculated among the above familiarities 1 to 6, a value of the corresponding familiarity may be processed as "0."

An example of the familiarity information calculation processing implemented by the familiarity information calculating unit 107 according to the present embodiment has been simply described above with reference to FIG. 8 and FIG. 9. Next, an example of a screen generated by the display controlling unit 109 according to the present embodiment will be explained.

Figure 10:
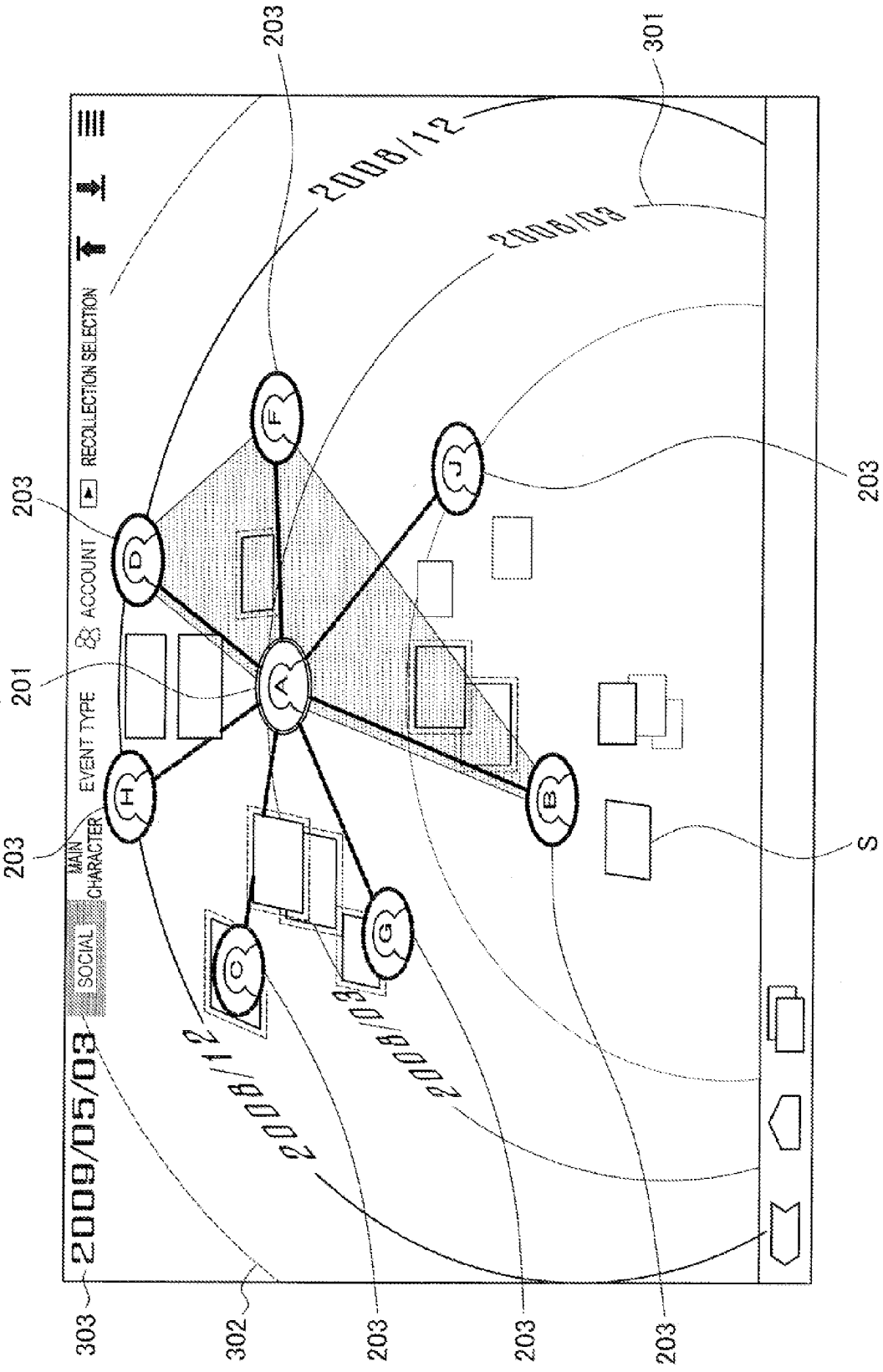
FIG. 10 is an explanatory diagram illustrating an example of a screen generated by a display controlling unit 109 according to an embodiment of the present disclosure.

FIG. 10 is an explanatory diagram illustrating an example of a screen generated by the display controlling unit 109 according to an embodiment of the present disclosure. In the following, using FIG. 10, an example of the screen generated by the display controlling unit 109 according to the present embodiment will be explained. Also, in the following explanation, "character" represents a specific character and has information about relationships with other characters (e.g. family, friend, acquaintance and others), "picture" represents one picture, "motion picture" represents one frame formed with at least one scene, "event" represents a collection of significant pictures or motion pictures, and "content" represents one of a picture, motion picture and event, and has information about the start time, end time and associated characters.

As illustrated in FIG. 10, in the xyz space, the display controlling unit 109 arranges a correlation diagram using the relationship information generated by the relationship information generating unit 105 and the content thumbnail image S stored in the storing unit 111. The personal correlation diagram is displayed on the x-y plane and the content thumbnail image S is displayed on the z axis direction in addition to the x-y plane. Subsequently, as illustrated in FIG. 10, the display controlling unit 109 performs control such that the xyz space is displayed in a state where it is overviewed from the obliquely upward direction of the z axis direction.

As illustrated in FIG. 10, the display controlling unit 109 performs control so as to display a scale 301 indicating the date and a line 302 indicating the focused time and date. Also, the display controlling unit 109 performs control such that the time and date corresponding to the line 302 indicating the focused time and date is displayed on a time and date display area 303.

Although the display controlling unit 109 displays correlation diagrams generated by the correlation visualizing unit 103 on the xyz space, especially, it performs control such that, among the correlation diagrams, a correlation diagram in the focused time and date is displayed on the x-y plane. Subsequently, the display controlling unit 109 performs control such that the thumbnail images S of pieces of content such as pictures, motion pictures and events stored in the storing unit 111 are arranged and displayed in chronological order using the z axis as the time axis.

Here, the content thumbnail image S is arranged near an object of a focused character (i.e. reference character object 201) in the correlation diagram and an object of a character (e.g. family and friend) related to the focused character (i.e. associated character object 203). Although the display controlling unit 109 performs control so as to display only a correlation diagram on the focused time and date, it performs control such that the content thumbnail images S about the past and future with respect to the above time and date are also displayed. The arrangement position of the content thumbnail image S at this time is controlled such that it is arranged near each character in the current, past and future correlation diagrams. Also, the arrangement start position of the content thumbnail image S in the z axis direction corresponds to the content start time. Also, at the time of the arrangement of the content thumbnail image S, the display controlling unit 109 may perform control so as to arrange it in the center of gravity of arrangement positions of character objects in the current, past and future correlation diagrams.

It is possible to freely change the focused time and date according to a user operation, and, based on the change of the focused time and date, the display controlling unit 109 changes details of the correlation diagrams generated by the correlation visualizing unit 103. The correlation visualizing unit 103 may create the correlation diagrams at predetermined time intervals (for example, every month), and, in the case of displaying a correlation diagram at arbitrary time, the display controlling unit 109 may display it with linear interpolation of character positions in two correlation diagrams created at the closest time points before and after the time.

The display controlling unit 109 may highlight the content thumbnail image S on the focused time and date or the time and date near the focused time and date, so as to be distinguished from other thumbnail images S. For example, the display controlling unit 109 may attach a frame of a specific color to the content thumbnail image S near the focused time and date or perform control such that the content thumbnail image S near the focused time and date is displayed so as to be slightly larger than other thumbnail images S.

Figure 11:
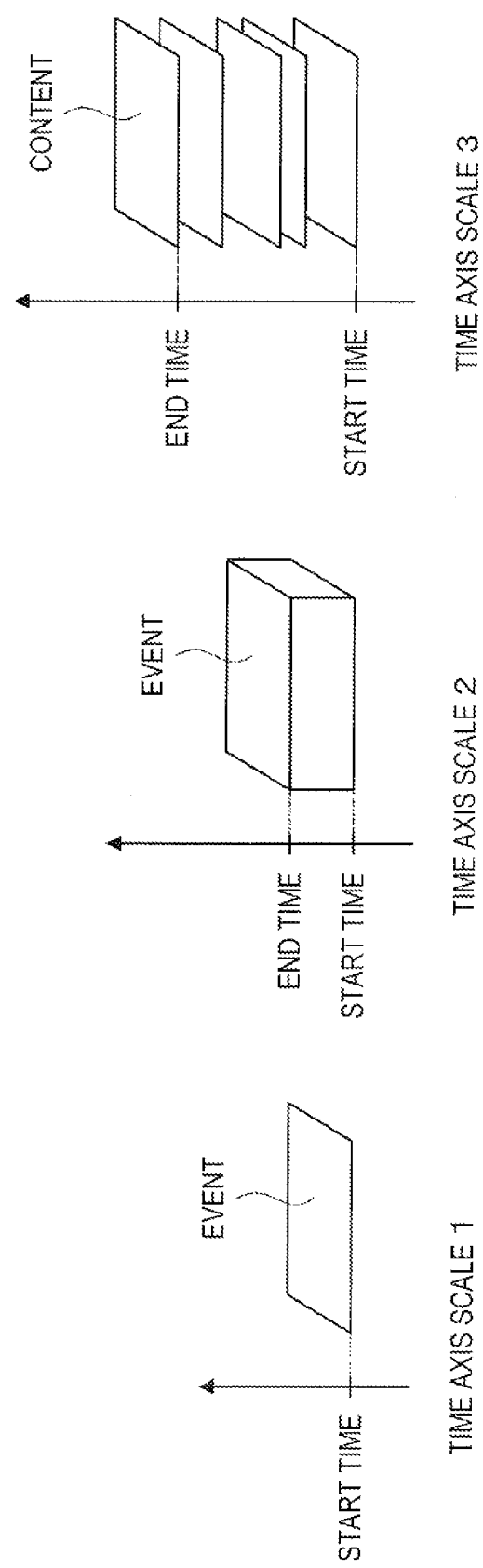
FIG. 11 is an explanatory diagram illustrating a display change example according to changes in the time axis scale.

The display controlling unit 109 can change the scale of the time axis in the xyz space as illustrated in FIG. 10, by a user operation. FIG. 11 is an explanatory diagram illustrating a display change example according to changes in the time axis scale. The display controlling unit 109 increases the thickness between the start time and the end time by enlarging the time axis scale and displays an event or motion picture content (time axis scale 1 to time axis scale 2), and, by further enlarging it, it is possible to perform control so as to display the content or motion picture scenes included in the event in a division manner (time axis scale 2 to time axis scale 3). A user operation example to change the time axis scale will be described later.

As described above, the display controlling unit 109 can perform control so as to scroll the time axis in the z axis direction according to a user operation. FIG. 12 is an explanatory diagram illustrating an example of scrolling the time axis in the z axis direction according to a user operation. When the user performs a drag operation in the vertical direction (i.e. z axis direction) with respect to a screen displayed by the display controlling unit 109, the user operation information generating unit 101 generates operation information according to the drag operation and transmits the operation information to the display controlling unit 109. The display controlling unit 109 scrolls the time axis based on the operation information transmitted from the user operation information generating unit 101. The display controlling unit 109 performs control so as to change and display the details of a correlation diagram generated by the correlation visualizing unit 103 according to the scroll of the time axis. Also, the display controlling unit 109 performs control so as to change and display a position of the thumbnail image S of each content according to the scroll of the time axis.

For example, as long as a display apparatus to display a screen by the display controlling unit 109 has a touch panel, the user's drag operation in the vertical direction may be performed by a contact operation by one finger of the user with respect to the touch panel.

The display controlling unit 109 may perform control so as to rotate the x-y plane with respect to the z axis according to a user operation. FIG. 13 is an explanatory diagram illustrating a control example of rotating the x-y plane with respect to the z axis according to a user operation. When the user performs a drag operation in the horizontal direction (i.e. direction orthogonal to the z axis direction) with respect to the screen displayed by the display controlling unit 109, the user operation information generating unit 101 generates operation information according to the drag operation and transmits the operation information to the display controlling unit 109. The display controlling unit 109 performs control so as to rotate the x-y plane with respect to the z axis based on the operation information transmitted from the user operation information generating unit 101. Also, the display controlling unit 109 performs control so as to change and display a position of the thumbnail image S of each content according to the rotation of the x-y plane.

The display controlling unit 109 may change a viewpoint position in the xyz space in which a correlation diagram and a thumbnail image are displayed, according to a user operation. To be more specific, the display controlling unit 109 may perform control so as to rotate the z axis with one certain axis substantially orthogonal to the z axis on the x-y plane regarded as the center, according to a user operation.

Figure 14:
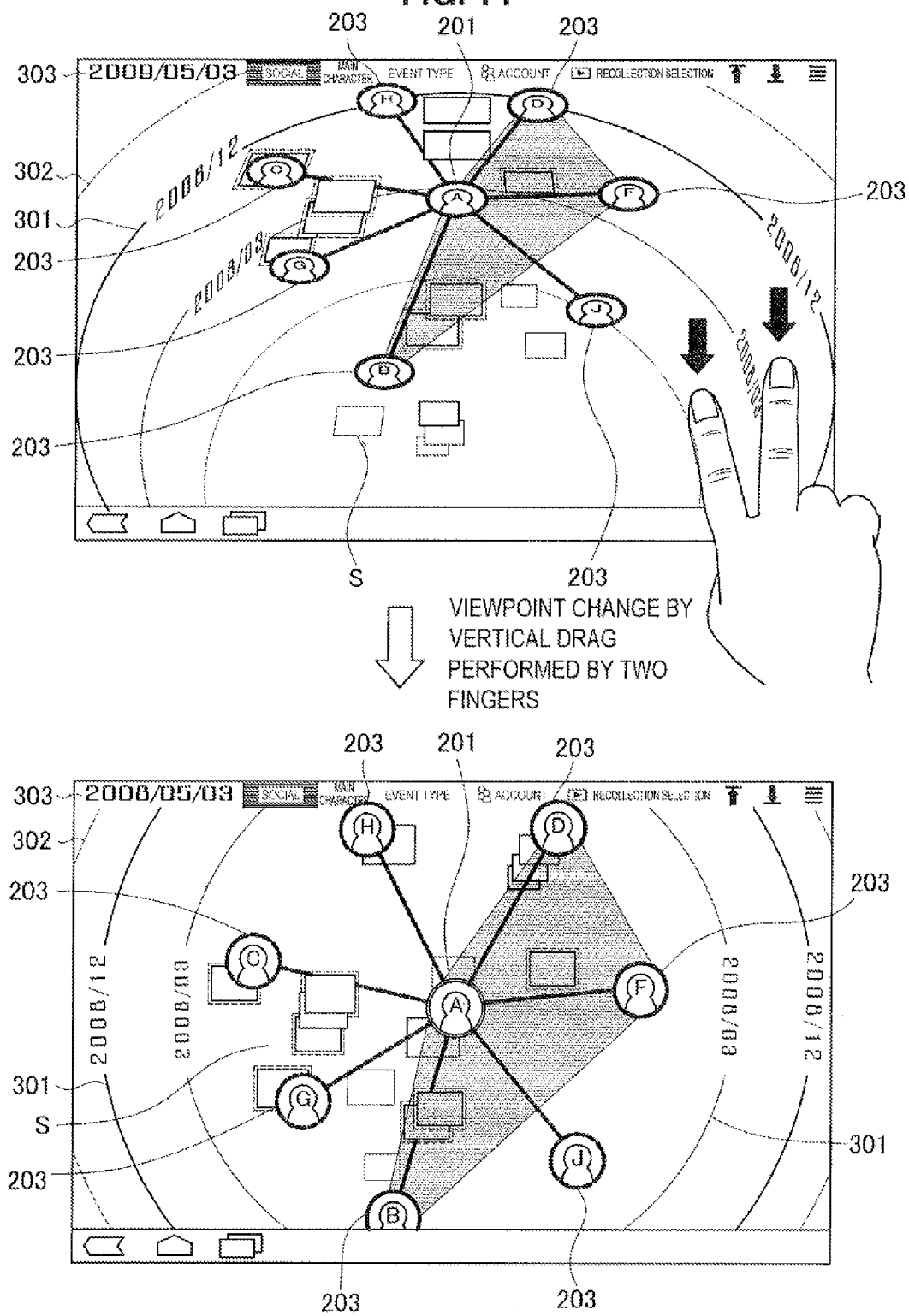
FIG. 14 is an explanatory diagram illustrating a control example of rotating the z axis with one certain axis substantially orthogonal to the z axis on the x-y plane as a center, according to a user operation.

FIG. 14 is an explanatory diagram illustrating a control example of rotating the z axis with one certain axis substantially orthogonal to the z axis on the x-y plane as the center, according to a user operation. When the user performs a drag operation different from the drag operation illustrated in FIG. 12 in the vertical direction (i.e. z axis direction) with respect to a screen displayed by the display controlling unit 109, the user operation information generating unit 101 generates operation information based on the drag operation and transmits the operation information to the display controlling unit 109. The display controlling unit 109 performs control so as to rotate the z axis with one certain axis substantially orthogonal to the z axis on the x-y plane regarded as the center, based on the operation information transmitted from the user operation information generating unit 101. Also, the display controlling unit 109 performs control so as to change and display a position of the thumbnail image S of each content according to the rotation of the z axis.

FIG. 14 illustrates a contact operation performed by two fingers of the user onto a screen, as an example of a vertical-direction drag operation different from the drag operation illustrated in FIG. 12.

When the z axis is rotated as illustrated in FIG. 14, the display controlling unit 109 displays a correlation diagram and the thumbnail image S so as to be overviewed from the top. As described above, although the display controlling unit 109 performs control so as to display content thumbnail images about the past and future with respect to focused time and date, as the slope of the z axis is larger, a content thumbnail image about the future with respect to the focused time and date overlaps a content thumbnail before the focused time and date, and therefore the legibility of the content thumbnail image before the focused time and date is reduced.

Therefore, when the slope of the z axis is equal to or greater than a predetermined amount, the display controlling unit 109 according to the present embodiment may change a display state of the content thumbnail image about the future with respect to the focused time and date. For example, as the slope of the z axis further increases over a certain predetermined amount by a drag operation, the display controlling unit 109 may change the transmittance such that the thumbnail image becomes thinner. Also, for example, when the slope of the z axis reaches a predetermined amount by a drag operation, the display controlling unit 109 may perform control so as to hide the thumbnail image at the time.

The display controlling unit 109 can scroll the time axis in the z axis direction as illustrated in FIG. 12, according to a user operation even when the slope of the z axis is in any state, but a user operation for the scroll in the z axis direction may be changed according to the slope level of the z axis. For example, as illustrated in the right side of FIG. 14, in a state where the z axis is completely orthogonal to the screen, for example, the scroll in the z axis direction may be performed by pressing the screen or pressing a touch panel in a case where the touch panel is set on the back side of the screen.

When a user operation is performed with respect to the content thumbnail image S displayed as above, the display controlling unit 109 according to the present embodiment may perform control so as to enlarge and display content corresponding to the thumbnail image S on a screen. FIG. 15 is an explanatory diagram illustrating an example of displaying the content corresponding to the thumbnail image S operated by the user, on the screen. When the user performs a selection operation of a certain content thumbnail image S with respect to the screen displayed by the display controlling unit 109, the user operation information generating unit 101 generates operation information based on the selection operation and transmits the operation information to the display controlling unit 109. Based on the operation information transmitted from the user operation information generating unit 101, the display controlling unit 109 performs control so as to enlarge and display the content corresponding to the selected thumbnail image S on the screen. Also, in a case where the content corresponding to the selected thumbnail image S is a dynamic image or an event including multiple pieces of content, according to further another operation (e.g. flick operation for flip by finger) by the user, the display controlling unit 109 may perform control so as to display motion picture scenes or pieces of content included in the event in order.

The display controlling unit 109 according to the present embodiment may change the scale of the time axis displayed on the screen according to a user scaling operation with respect to a correlation diagram and thumbnail image S displayed on the screen.

FIG. 16 is an explanatory diagram illustrating an example of changing the scale of the time axis displayed on a screen, according to a scaling operation by the user. When the user performs an operation of scaling a screen (e.g. pinch operation performed by two fingers in the vertical direction or double tap operation by one finger) on the screen displayed by the display controlling unit 109, the user operation information generating unit 101 generates operation information based on the operation and transmits the operation information to the display controlling unit 109. Based on the operation information transmitted from the user operation information generating unit 101, the display controlling unit 109 performs control so as to change the scale of the time axis displayed on the screen. In this way, for example, by a change operation of the time axis scale by the user, it is possible to enhance the legibility in a part in which content thumbnail images S are closely set.

Although an example has been described above where a character correlation diagram and the content thumbnail image S related to each character are displayed on the same screen together, a screen displayed on a display apparatus by the information processing apparatus 10 according to the present embodiment is not limited to the example. For example, the information processing apparatus 10 according to the present embodiment may perform control so as to classify and display content thumbnail images S according to the content attributes.

Figure 17A:
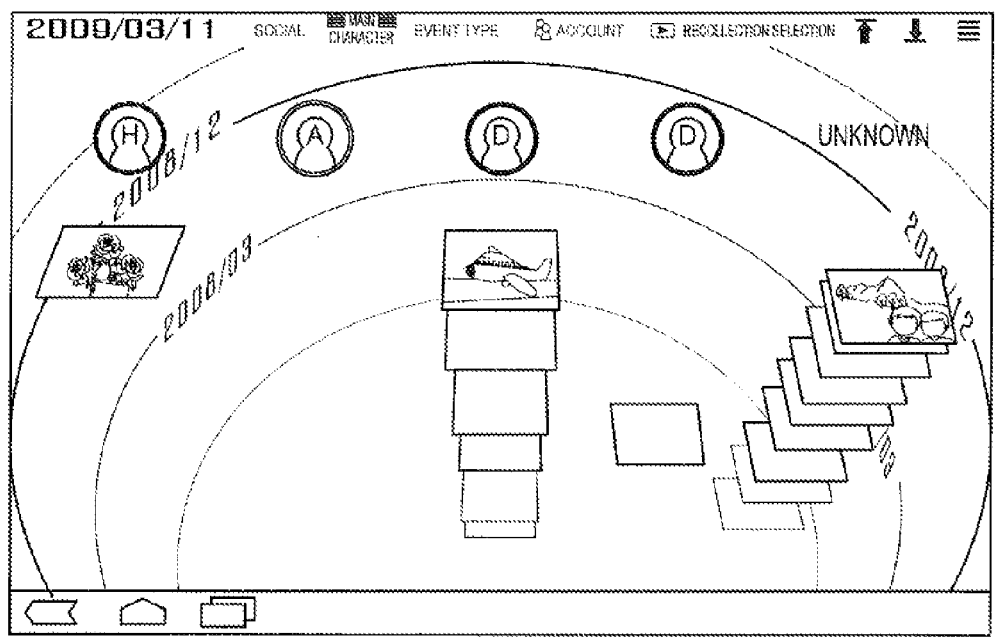
FIG. 17A is an explanatory diagram illustrating a control example of classifying and displaying content thumbnail images S according to the content attributes.
Figure 17B:
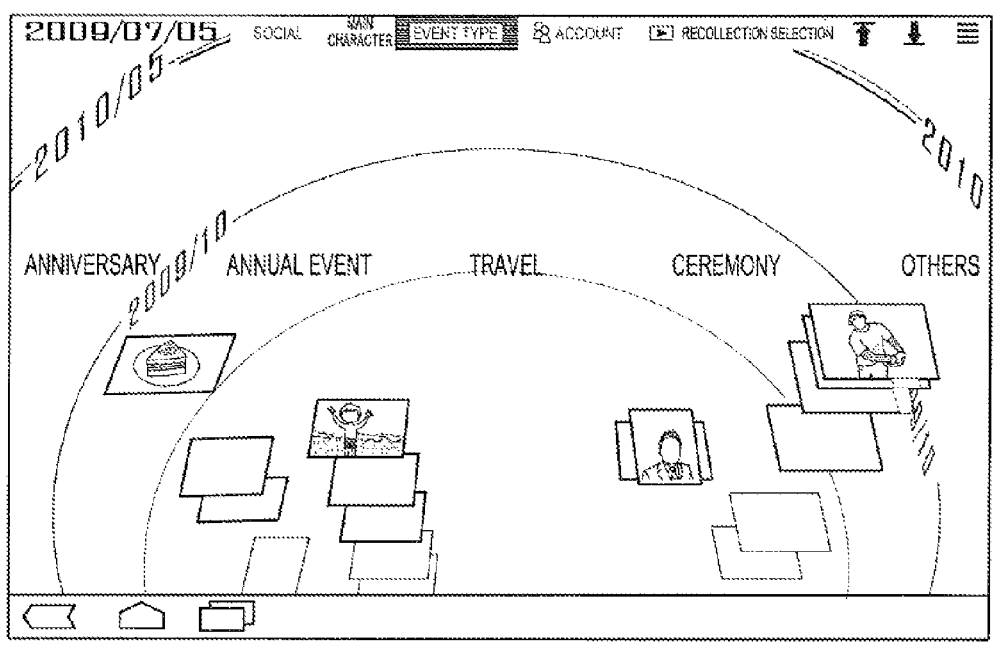
FIG. 17B is an explanatory diagram illustrating a control example of classifying and displaying content thumbnail images S according to the content attributes.

FIG. 17A and FIG. 17B are explanatory diagrams illustrating a control example of classifying and displaying content thumbnail images S according to the content attributes. FIG. 17A illustrates that content thumbnail images S are classified by the main characters of the pieces of content, and FIG. 17B illustrates that content thumbnail images S are classified by the event details.

As illustrated in FIG. 17A and FIG. 17B, even in a case where content thumbnail images S are classified and displayed according to the content attributes, based on a user operation, the information processing apparatus 10 according to the present embodiment may perform a viewpoint change by rotation of the z axis as illustrated in FIG. 14, content selection as illustrated in FIG. 15 and a change of the time axis scale as illustrated in FIG. 16.

[Operations of Information Processing Apparatus]

Next, operations of the information processing apparatus 10 according to the present embodiment will be explained. First, an example of correlation diagram generation and display processing on a screen will be explained. FIG. 18 is a flowchart illustrating an example of operations of the information processing apparatus 10 according to the present embodiment.

First, the correlation visualizing unit 103 of the information processing apparatus 10 refers to user operation information output from the user operation information generating unit 101 and sets characters (i.e. reference characters) which are references to generate a correlation diagram (step S101). After that, the correlation visualizing unit 103 requests relationship information generation and familiarity information calculation with respect to reference character information and each time in a focused time zone, to the relationship information generating unit 105 and the familiarity information calculating unit 107.

When acquiring the relationship information generated by the relationship information generating unit 105 and the familiarity information calculated by the familiarity information calculating unit 107 (step S103), using this acquired information, the correlation visualizing unit 103 adjusts object arrangement conditions between adjacent times (step S105) and determines object arrangement in conformity to various methods (step S107).

Subsequently, the correlation visualizing unit 103 extracts a data group displayed on a correlation diagram from data groups stored in the storing unit 111 or the like, and sets an arrangement position of the corresponding data group in the correlation diagram (step S109). Besides, the correlation visualizing unit 103 displays the generated correlation diagram on a display screen through the display controlling unit 109 (step S111). In this way, the generated correlation diagram is displayed on the display screen of the information processing apparatus 10 or the like.

By implementing processing in such a flow, a correlation diagram is displayed on the display screen of the information processing apparatus 10 or a display screen of a device that can communicate with the information processing apparatus 10, and the user can easily grasp a personal relationship with a focused character and its time variation.

Next, an explanation will be given to a processing example at the time the information processing apparatus 10 displays a correlation diagram and thumbnail image S on a display apparatus and subsequently changes the display according to a user operation. FIG. 19 is a flowchart illustrating an example of operations of the information processing apparatus 10 according to the present embodiment.

The information processing apparatus 10 decides whether a rotation operation in the z axis direction is detected, with respect to the correlation diagram and thumbnail image displayed on the display apparatus (step S121). As a result of the decision in step S121, if the rotation operation in the z axis direction is not detected, the processing is finished. By contrast, as a result of the decision in step S121, if the rotation operation in the z axis direction is detected, the information processing apparatus 10 subsequently rotates the correlation diagram and thumbnail image displayed on the display apparatus, in the z axis direction, according to the rotation operation in the z axis direction (step S123).

After that, the information processing apparatus 10 decides whether there is foreground rotation equal to or greater than a predetermined angle in the z axis direction (step S125). As a result of the decision in step S125, if there is not foreground rotation equal to or greater than the predetermined angle in the z axis direction, the flow proceeds to step S121. Meanwhile, as a result of the decision in step S125, if there is foreground rotation equal to or greater than the predetermined angle in the z axis direction, the information processing apparatus 10 changes the drawing state of a content thumbnail image after the focused time and date (step S127). To be more specific, if there is foreground rotation equal to or greater than the predetermined angle in the z axis direction, the information processing apparatus 10 may change the transmittance such that the thumbnail image becomes thinner, or may perform control so as to hide the thumbnail image. By performing such control, the information processing apparatus 10 can perform display so as to maintain the legibility of a content thumbnail image before the focused time and date.

(Regarding Hardware Configuration)

Figure 20:
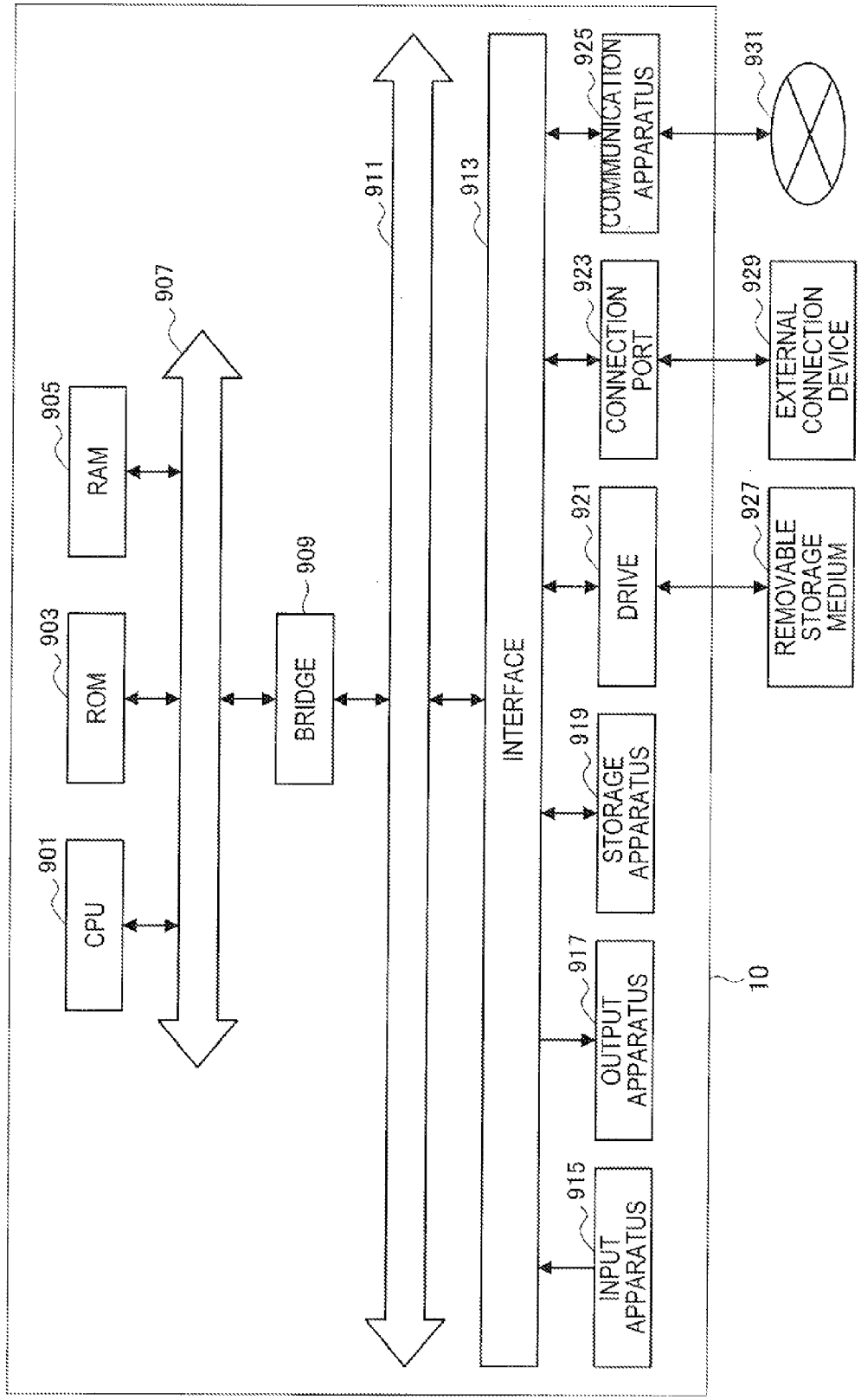
FIG. 20 is a block diagram for explaining a hardware configuration of the information processing apparatus 10 according to an embodiment of the present disclosure.

Next, with reference to FIG. 20, a hardware configuration of the information processing apparatus 10 according to an embodiment of the present disclosure will be explained in detail. FIG. 20 is a block diagram for explaining the hardware configuration of the information processing apparatus 10 according to an embodiment of the present disclosure.

The information processing apparatus 10 mainly includes a CPU 901, a ROM 903 and a RAM 905. Also, the information processing apparatus 10 further includes a host bus 907, a bridge 909, an external bus 911, an interface 913, an input apparatus 915, an output apparatus 917, a storage apparatus 919, a drive 921, a connection port 923 and a communication apparatus 925.

The CPU 901 functions as a computation processing apparatus and a control apparatus, and controls the whole or part of operations in the information processing apparatus 10 according to various programs stored in the ROM 903, the RAM 905, the storage apparatus 919 or the removable storage medium 927. The ROM 903 stores programs or computation parameters used in the CPU 901. The RAM 905 primarily stores programs used in the CPU 901 or parameters that are adequately changed in program execution. These are connected to each other by the host bus 907 formed with an internal bus such as a CPU bus.

The host bus 907 is connected to the external bus 911 such as a PCI (Peripheral Component Interconnect/Interface) bus via the bridge 909.

The input apparatus 915 denotes an operation section operated by the user, such as a mouse, keyboard, touch panel, button, switch and lever. Also, the input apparatus 915 may be a remote control section (so-called remote) using infrared ray other radio waves, or may be an external connection device 929 such as a mobile phone and PDA that can respond to an operation of the information processing apparatus 10. Further, for example, the input apparatus 915 generates an input signal based on information input by the user using the above operation section, and includes an input control circuit to output it to the CPU 901. By operating this input apparatus 915, the user of the information processing apparatus 10 can input various kinds of data or instruct a processing operation to the information processing apparatus 10.

The output apparatus 917 includes an apparatus that can visually or aurally report the acquired information to the user. Examples of such an apparatus include display apparatuses such as a CRT display apparatus, liquid crystal display apparatus, plasma display apparatus, EL display apparatus and lamp, a sound output apparatus such as a speaker and headphones, a printer apparatus, a mobile phone and a fax machine. The output apparatus 917 outputs results acquired by various kinds of processing performed by the information processing apparatus 10, for example. To be more specific, the display apparatus displays the results acquired by various kinds of processing performed by the information processing apparatus 10, by a text or image. Meanwhile, the sound output apparatus converts an audio signal formed with played sound data or acoustic data into an analog signal and outputs it.

The storage apparatus 919 denotes a data storage apparatus configured as an example of a storing unit of the information processing apparatus 10. The storage apparatus 919 includes, for example, a magnetic storage device such as HDD (Hard Disk Drive), a semiconductor storage device, an optical storage device or a magnetic optical storage device. This storage apparatus 919 stores programs and various kinds of data executed in the CPU 901 and various kinds of data acquired from the outside.

The drive 921 denotes a storage medium reader/writer and is included in the information processing apparatus 10 or attached to the outside. The drive 921 reads information stored in the removable storage medium 927 such as a mounted magnetic disk, optical disk, magnetic optical disk and semiconductor memory, and outputs it to the RAM 905. Also, the drive 921 writes the record in the removable storage medium 927 such as a mounted magnetic disk, optical disk, magnetic optical disk and semiconductor memory. The removal storage medium 927 is, for example, a DVD medium, a HD-DVD medium or a Blu-ray medium. Also, the removable storage medium 927 may be a compact flash (CF) (registered trademark), a flash memory or an SD memory card (i.e. Secure Digital memory card). Also, the removable storage medium 927 may be, for example, an IC card (i.e. Integrated Circuit card) mounting a non-contact IC chip or an electronic device.

The connection port 923 denotes a port to directly connect a device and the information processing apparatus 10. Examples of the connection port 923 include a USB (Universal Serial Bus) port, an IEEE 1394 port and an SCSI (Small Computer System Interface) port. Other examples of the connection port 923 include an ES-232C port, an optical audio terminal and an HDMI (High-Definition Multimedia Interface) port. BY connecting the external connection device 929 to this connection port 923, the information processing apparatus 10 directly acquires various kinds of data from the external connection device 929 and provides various kinds of data to the external connection device 929.

The communication apparatus 925 denotes a communication interface formed with, for example, a communication device for connection to a communication network 931. The communication apparatus 925 may denote, for example, a communication card for wired or wireless LAN (Local Area Network), Bluetooth (registered trademark) or WUSB (Wireless USB). Also, the communication apparatus 925 may denote a router for optical communication, a router for ADSL (Asymmetric Digital Subscriber Line) or a modem for various kinds of communication. This communication apparatus 925 can transmit/receive signals to/from the Internet or other communication devices in conformity to a predetermined protocol such as TCP/IP. Also, the communication network 931 connected to the communication apparatus 925 is formed with a network connected in a wired or wireless manner, and may denote, for example, the Internet, home LAN, infrared communication, radio communication or satellite communication.

An example of the hardware configuration that can realize the functions of the information processing apparatus 10 according to an embodiment of the present disclosure has been described above. Above each component may be formed using a general-purpose member or formed by hardware specialized in the function of each component. Therefore, depending on technical levels at the times of implementing the present embodiment, a used hardware configuration can be adequately changed.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, an example has been described with the above embodiment where, at the time of displaying a character correlation diagram, it is controlled such that a character correlation diagram using a certain character object as the center of one axis is generated and displayed on a screen, the present disclosure is not limited to such an example. For example, the information processing apparatus 10 may perform control so as to generate character correlation diagrams with respect to multiple axes such as a family and friend, and perform control so as to arrange a content thumbnail image S in each character correlation diagram.

Additionally, the present technology may also be configured as below.

(1) An information processing apparatus including:
a display controlling unit configured to, at a time of displaying content on a screen, set one axis in a three-dimensional space as a time axis, arrange pieces of content along one or more of the time axes, cause the time axis to be rotatable in a foreground direction and a background direction of the screen with one axis substantially orthogonal to the time axis regarded as a center, and, in a case where the time axis is inclined by a predetermined angle or more toward a foreground, change a display state of content after a predetermined reference time among the pieces of content arranged along the time axis.

(2) The information processing apparatus according to (1), wherein
the display controlling unit arranges, on the time axis, a node indicating a reference character in a data group corresponding to a collection of data including information related to time that is acquired by analyzing the content, arranges, in a position a predetermined distance apart from the time axis, a node indicating an associated character that is different from the reference character and associated with the reference character at a predetermined time point on the time axis, and arranges the content related to each node.

(3) The information processing apparatus according to (2), further including:
a correlation information generating unit configured to generate correlation information that visualizes a correlation between the reference character and the associated character and a time variation in the correlation, using relationship information indicating a relationship between characters associated with the data group at a time point in a time series of the data group and familiarity information indicating familiarity between characters associated with the data group, calculated based on the data group.

(4) The information processing apparatus according to (3), wherein
the display controlling unit arranges the node indicating the reference character and the node indicating the associated character, using the correlation information in the predetermined reference time that is generated by the correlation information generating unit.

(5) The information processing apparatus according to any one of (2) to (4), wherein
the display controlling unit arranges the content related to each node at a center of gravity of the node indicating the reference character and the node indicating the associated character.

(6) The information processing apparatus according to any one of (1) to (5), wherein
the display controlling unit arranges pieces of strongly-related content as one aggregation in the three-dimensional space.

(7) The information processing apparatus according to (6), wherein
the display controlling unit increases a thickness in a direction of the time axis and arranges the pieces of content as one aggregation.

(8) The information processing apparatus according to any one of (1) to (7), wherein
the display controlling unit scrolls a display in a direction of the time axis according to a drag operation along the direction of the time axis.

(9) The information processing apparatus according to any of (1) to (8), wherein the display controlling unit rotates a display with the time axis regarded as a center, according to a drag operation in a direction vertical to a direction of the time axis.

(10) The information processing apparatus according to any one of (1) to (9), wherein
the display controlling unit rotates the time axis in the foreground direction and the background direction of the screen with one axis substantially orthogonal to the time axis regarded as a center, according to a drag operation performed by two fingers along a direction of the time axis.

(11) The information processing apparatus according to any one of (1) to (10), wherein
the display controlling unit changes a scale of the time axis, according to a pinch operation performed by two fingers along a direction of the time axis.

(12) The information processing apparatus according to (11), wherein
the display controlling unit increases a thickness in the direction of the time axis and arranges the pieces of content as one aggregation, and, in a case where the thickness is over a predetermined value by a change of the scale of the time axis, divides the pieces of content arranged as the aggregation into predetermined units and displays the divided pieces of content.

(13) The information processing apparatus according to any one of (1) to (12), wherein
the display controlling unit highlights the content positioned on the predetermined reference time.

(14) The information processing apparatus according to any one of (1) to (13), wherein
in a case where the time axis is inclined by a predetermined angle or more toward a foreground, the display controlling unit hides the content after the predetermined reference time among the pieces of content arranged along the time axis.

(15) An information processing method including:
display controlling operations of, at a time of displaying content on a screen, setting one axis in a three-dimensional space as a time axis, arranging pieces of content along one or more of the time axes, causing the time axis to be rotatable in a foreground direction and a background direction of the screen with one axis substantially orthogonal to the time axis regarded as a center, and, in a case where the time axis is inclined by a predetermined angle or more toward a foreground, changing a display state of content after a predetermined reference time among the pieces of content arranged along the time axis.

(16) A computer program for causing a computer to execute:
display control operations of, at a time of displaying content on a screen, setting one axis in a three-dimensional space as a time axis, arranging pieces of content along one or more of the time axes, causing the time axis to be rotatable in a foreground direction and a background direction of the screen with one axis substantially orthogonal to the time axis regarded as a center, and, in a case where the time axis is inclined by a predetermined angle or more toward a foreground, changing a display state of content after a predetermined reference time among the pieces of content arranged along the time axis.

What is claimed is:

1. An information processing apparatus comprising:
a display controlling unit configured to, at a time of displaying content on a screen,
set one axis in a three-dimensional space as a time axis,
arrange pieces of content along the time axis,
cause the time axis to be rotatable in a foreground direction and a background direction of the screen with one axis substantially orthogonal to the time axis regarded as a center, and
in a case where the time axis is inclined by a predetermined angle or more toward a foreground, change a display state of content associated with time after a predetermined reference time by changing transmittance of the content associated with the time after the predetermined reference time, wherein the content associated with the time after the predetermined reference time is among the pieces of content arranged along the time axis; and
a correlation information generating unit configured to generate correlation information that visualizes, on the time axis, a correlation between a reference character and an associated character different from the reference character,
wherein the correlation information is generated using familiarity between an image of the reference character and an image of the associated character, imaged within the pieces of content.

2. The information processing apparatus according to claim 1, wherein the display controlling unit is configured to:
arrange, on the time axis, a node indicating the reference character in a data group corresponding to a collection of data, wherein the collection data includes information related to time, wherein the information related to time is acquired by analyzing the content,
arrange, in a position a predetermined distance apart from the time axis, a node indicating the associated character, wherein the associated character is associated with the reference character at a predetermined time point on the time axis, and
arrange the content related to each of the node indicating the reference character and the node indicating the associated character.

3. The information processing apparatus according to claim 2, wherein:
the correlation information generating unit is configured to generate the correlation information that visualizes a time variation in the correlation,
wherein the correlation information is further generated using relationship information indicating a relationship between characters associated with the data group at a time point in a time series of the data group and familiarity information indicating familiarity between characters associated with the data group, wherein the familiarity information is calculated based on the data group.

4. The information processing apparatus according to claim 3, wherein the display controlling unit is configured to arrange the node indicating the reference character and the node indicating the associated character, using the correlation information in the predetermined reference time that is generated by the correlation information generating unit.

5. The information processing apparatus according to claim 2, wherein the display controlling unit is configured to arrange the content related to each node at a center of gravity of arrangement positions of the node indicating the reference character and the node indicating the associated character.

6. The information processing apparatus according to claim 1, wherein the display controlling unit is configured to arrange the pieces of content corresponding to the reference character and the associated character as one aggregation in the three-dimensional space.

7. The information processing apparatus according to claim 6, wherein the display controlling unit is configured to increase a thickness in a direction of the time axis and arrange the pieces of content as one aggregation.

8. The information processing apparatus according to claim 1, wherein the display controlling unit is configured to scroll a display in a direction of the time axis according to a drag operation along the direction of the time axis.

9. The information processing apparatus according to claim 1, wherein the display controlling unit is configured to rotate a display with the time axis regarded as a center, according to a drag operation in a direction vertical to a direction of the time axis.

10. The information processing apparatus according to claim 1, wherein the display controlling unit is configured to rotate the time axis in the foreground direction and the background direction of the screen with one axis substantially orthogonal to the time axis regarded as a center, according to a drag operation performed by two fingers along a direction of the time axis.

11. The information processing apparatus according to claim 1, wherein the display controlling unit is configured to change a scale of the time axis, according to a pinch operation performed by two fingers along a direction of the time axis.

12. The information processing apparatus according to claim 11, wherein the display controlling unit is configured to increase a thickness in the direction of the time axis and arrange the pieces of content as one aggregation according to a change of the scale of time axis, and, in a case where the thickness is over a predetermined value by a change of the scale of the time axis, divide the pieces of content arranged as the aggregation into predetermined units and display the divided pieces of content.

13. The information processing apparatus according to claim 1, wherein the display controlling unit is configured to highlight the content positioned on the predetermined reference time.

14. The information processing apparatus according to claim 1, wherein in a case where the time axis is inclined by the predetermined angle or more toward the foreground, the display controlling unit is configured to hide the content associated with the time after the predetermined reference time.

15. An information processing method comprising:
    display controlling operations of, at a time of displaying content on a screen,
    setting one axis in a three-dimensional space as a time axis,
    arranging pieces of content along the time axis,
    causing the time axis to be rotatable in a foreground direction and a background direction of the screen with one axis substantially orthogonal to the time axis regarded as a center,
    in a case where the time axis is inclined by a predetermined angle or more toward a foreground, changing a display state of content associated with time after a predetermined reference time by changing transmittance of the content associated with the time after the predetermined reference time, wherein the content associated with the time after the predetermined reference time is among the pieces of content arranged along the time axis, and
    generating correlation information that visualizes, on the time axis, a correlation between a reference character and an associated character different from the reference character,
    wherein the correlation information is generated using familiarity between an image of the reference character and an image of the associated character, imaged within the pieces of content.

16. A non-transitory computer-readable storage medium having stored thereon a set of computer-executable instructions for causing a computer to perform display control operation, at a time of displaying content on a screen, the display control operation comprising:
    setting one axis in a three-dimensional space as a time axis,
    arranging pieces of content along the time axis,
    causing the time axis to be rotatable in a foreground direction and a background direction of the screen with one axis substantially orthogonal to the time axis regarded as a center,
    in a case where the time axis is inclined by a predetermined angle or more toward a foreground, changing a display state of content associated with time after a predetermined reference time by changing transmittance of the content associated with the time after the predetermined reference time, wherein the content associated with the time after the predetermined reference time is among the pieces of content arranged along the time axis, and
    generating correlation information that visualizes, on the time axis, a correlation between a reference character and an associated character different from the reference character,
    wherein the correlation information is generated using familiarity between an image of the reference character and an image of the associated character, imaged within the pieces of content.

* * * * *